(12) United States Patent
Hanai et al.

(10) Patent No.: US 10,181,221 B2
(45) Date of Patent: Jan. 15, 2019

(54) DISPLAY CONTROL APPARATUS, DISPLAY CONTROL METHOD, AND PROGRAM

(71) Applicant: SONY CORPORATION, Tokyo (JP)

(72) Inventors: Yuya Hanai, Tokyo (JP); Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/454,516

(22) Filed: Mar. 9, 2017

(65) Prior Publication Data

US 2017/0186239 A1    Jun. 29, 2017

Related U.S. Application Data

(63) Continuation of application No. 14/433,073, filed as application No. PCT/JP2013/078592 on Oct. 22, 2013, now Pat. No. 9,613,461.

(30) Foreign Application Priority Data

Dec. 10, 2012  (JP) ................. 2012-269191

(51) Int. Cl.
```
G09G 5/00      (2006.01)
G06T 19/00     (2011.01)
G06F 1/16      (2006.01)
G06F 3/0481    (2013.01)
G06F 3/0346    (2013.01)
G06F 3/01      (2006.01)
G06T 5/00      (2006.01)
```
(52) U.S. Cl.
CPC .......... *G06T 19/006* (2013.01); *G06F 1/1686* (2013.01); *G06F 3/013* (2013.01); *G06F 3/0346* (2013.01); *G06F 3/0481* (2013.01); *G06T 5/00* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 6,937,255 | B2 | 8/2005 | Fukuda et al. |
| 2007/0273644 | A1 | 11/2007 | Mondine Natucci |
| 2008/0036875 | A1 | 2/2008 | Jones et al. |

(Continued)

FOREIGN PATENT DOCUMENTS

| | | |
|---|---|---|
| JP | 2000-276613 | 10/2000 |
| JP | 2006-155238 | 6/2006 |

(Continued)

OTHER PUBLICATIONS

Transforming Assessment, "Augmented reality music band", Aug. 25, 2010, URL: https://www.youtube.com/watch?v=5tSFk2obT3E.*

(Continued)

*Primary Examiner* — David H Chu
(74) *Attorney, Agent, or Firm* — Paratus Law Group, PLLC

(57) ABSTRACT

Provided is a display control apparatus including a state detection unit configured to detect a state of a user who observes an image, and a display control unit configured to cause a display to display the image in which a plurality of display content items are superimposed on a photographed image, and to control a behavior of each of the display content items according to the state of the user.

20 Claims, 34 Drawing Sheets

(56) References Cited

U.S. PATENT DOCUMENTS

| | | |
|---|---|---|
| 2011/0254861 A1 | 10/2011 | Emura et al. |
| 2012/0113092 A1* | 5/2012 | Bar-Zeev ............ G02B 27/017 345/419 |
| 2012/0114137 A1 | 5/2012 | Tsurumi |
| 2012/0218299 A1 | 8/2012 | Hayakawa |
| 2013/0002717 A1 | 1/2013 | Deffeyes et al. |
| 2013/0023342 A1 | 1/2013 | Jung et al. |
| 2013/0086077 A1 | 4/2013 | Piippo et al. |
| 2013/0147836 A1 | 6/2013 | Small et al. |
| 2013/0278636 A1 | 10/2013 | Ota et al. |
| 2013/0328925 A1 | 12/2013 | Latta et al. |
| 2014/0043322 A1 | 2/2014 | Fulks et al. |
| 2014/0043365 A1 | 2/2014 | Fialho et al. |
| 2016/0026253 A1 | 1/2016 | Bradski et al. |

FOREIGN PATENT DOCUMENTS

| | | |
|---|---|---|
| JP | 2008-046806 | 2/2008 |
| JP | 2010-238096 | 10/2010 |
| JP | 2011-118687 | 6/2011 |
| JP | 2012-048597 | 3/2012 |
| JP | 2012-058838 | 3/2012 |
| JP | 2012-058968 | 3/2012 |
| JP | 2012-104871 | 5/2012 |
| JP | 2012-178067 | 9/2012 |

OTHER PUBLICATIONS

Donovan, "Metaio's New SDK Allows SLAM Mapping From 1,000 Feet", Oct. 18, 2012, URL: https://techcrunch.com/2012/10/18/metaios-new-sdk-allows-slam-mapping-from-1000-feet/.*

Julian, "Chocolate and Tunes Collide with the Kit Kat Augmented Reality Campaign", Oct. 2, 2010, URL: http://www.trendhunter.com/trends/augmented-reality1.

Jonathan Morrison, "Nintendo 3DS Hands-On Demo: AR Cards", Mar. 27, 2011, URL: https://www.youtube.com/watch?v=xk0MHAs48Vs.

Oct. 23, 2018, European Communication issued for related EP application No. 13861660.2.

* cited by examiner

FIG.10
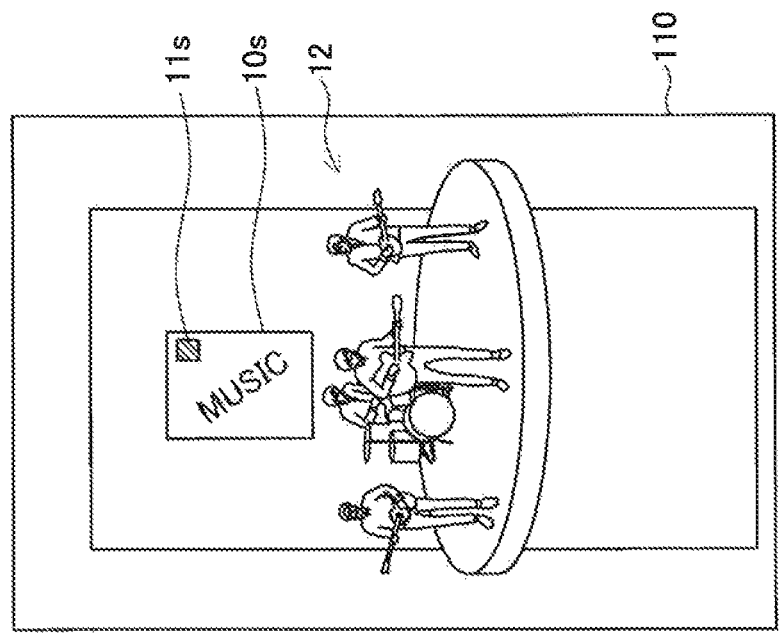
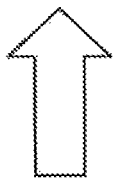
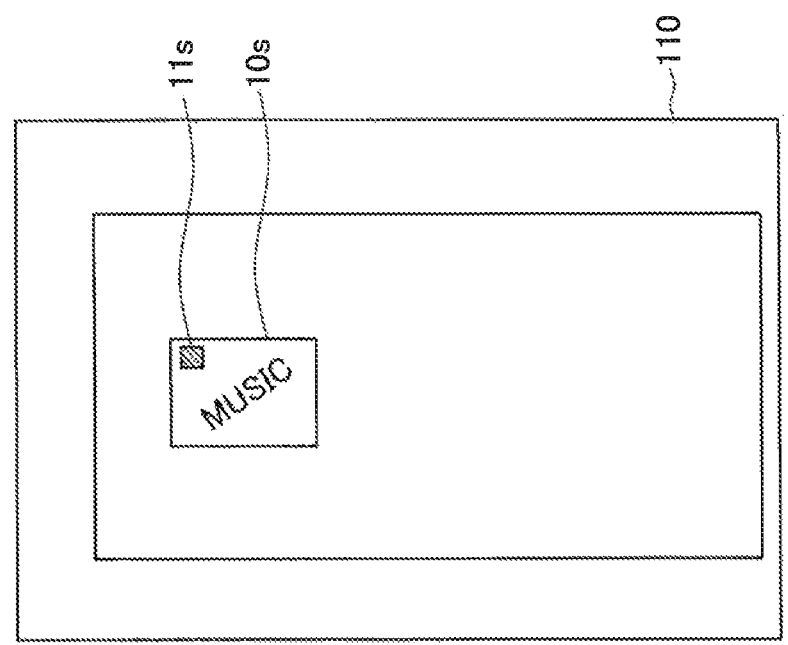

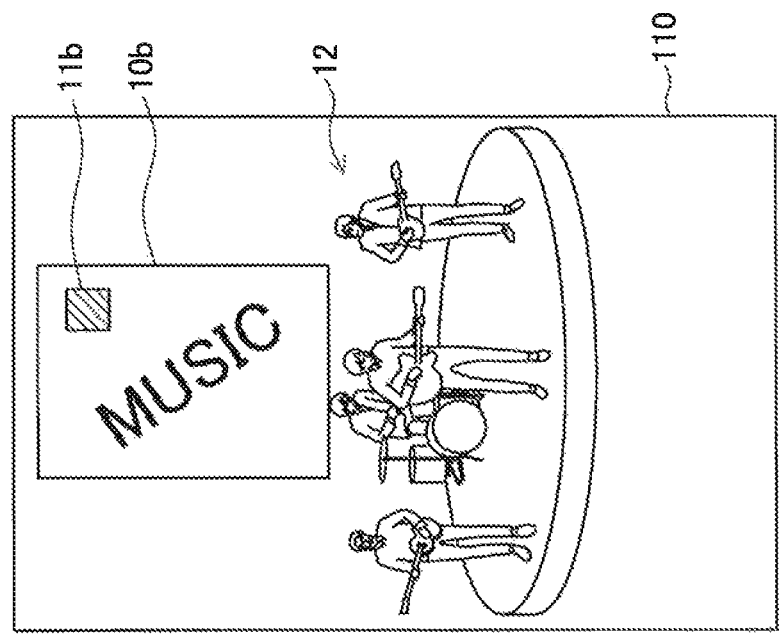
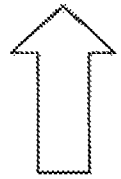
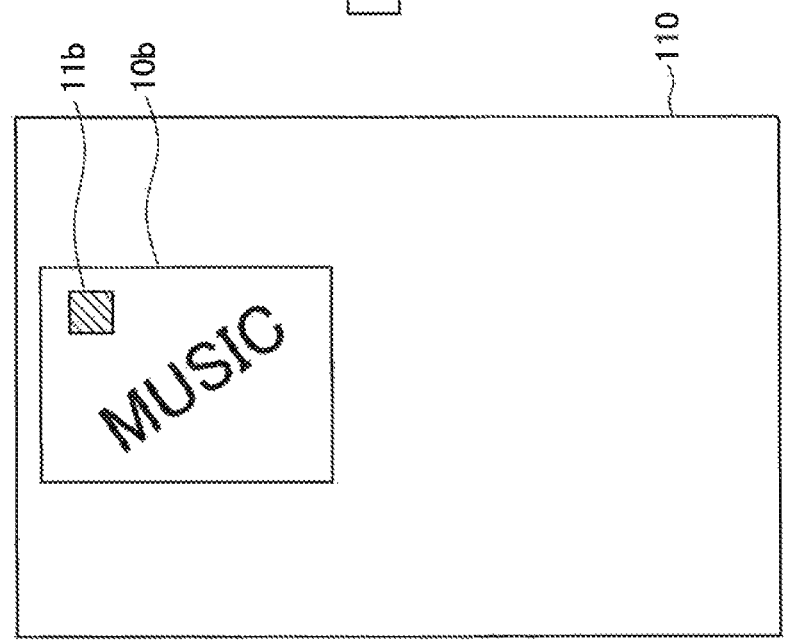
FIG.11

FIG.13
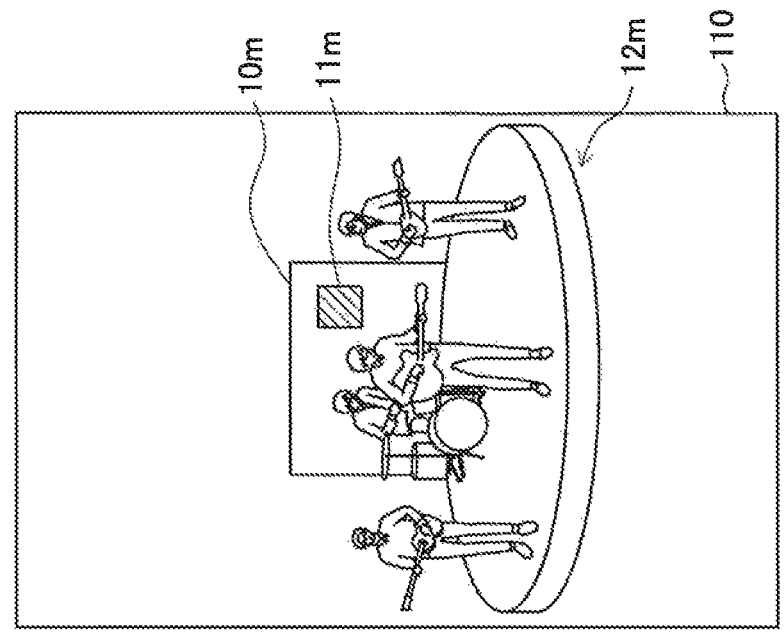
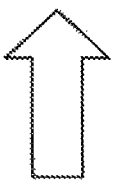
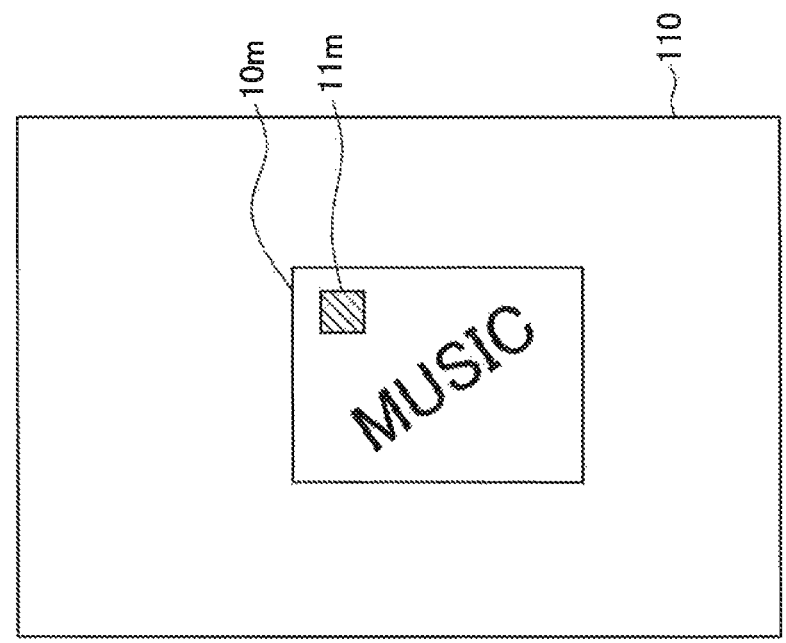

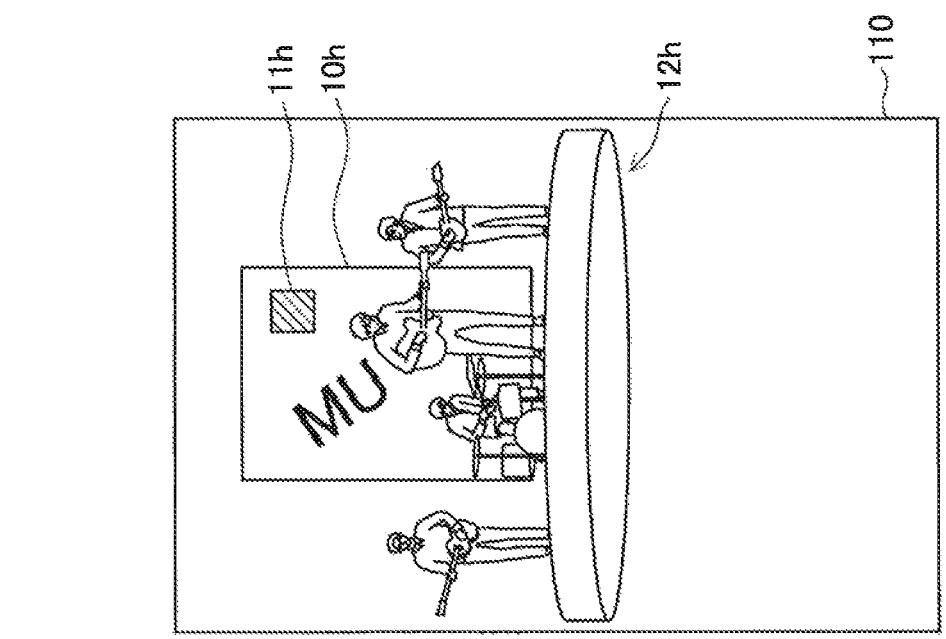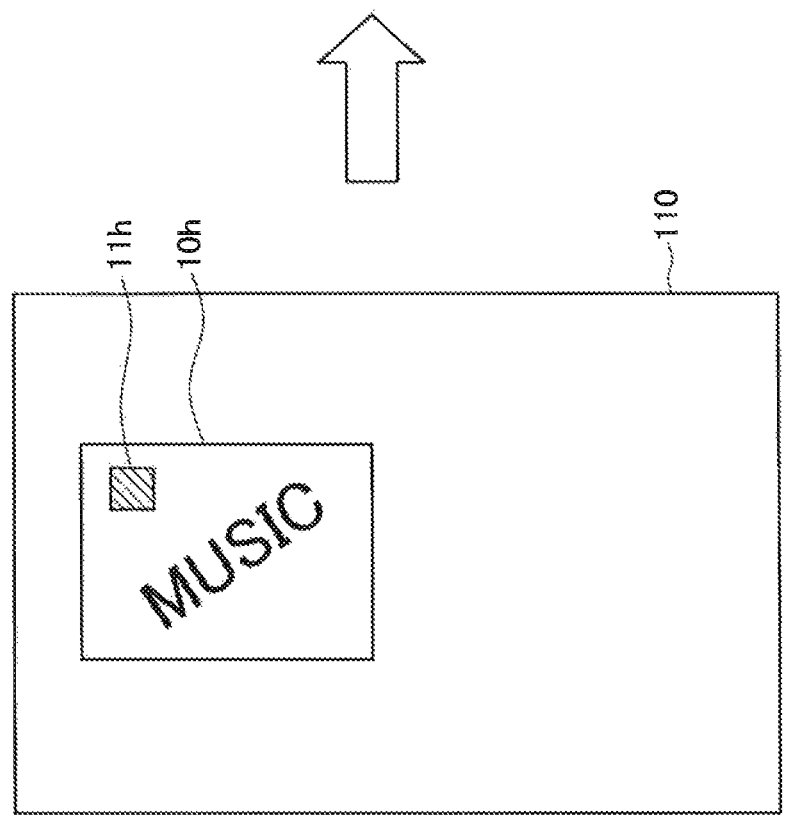

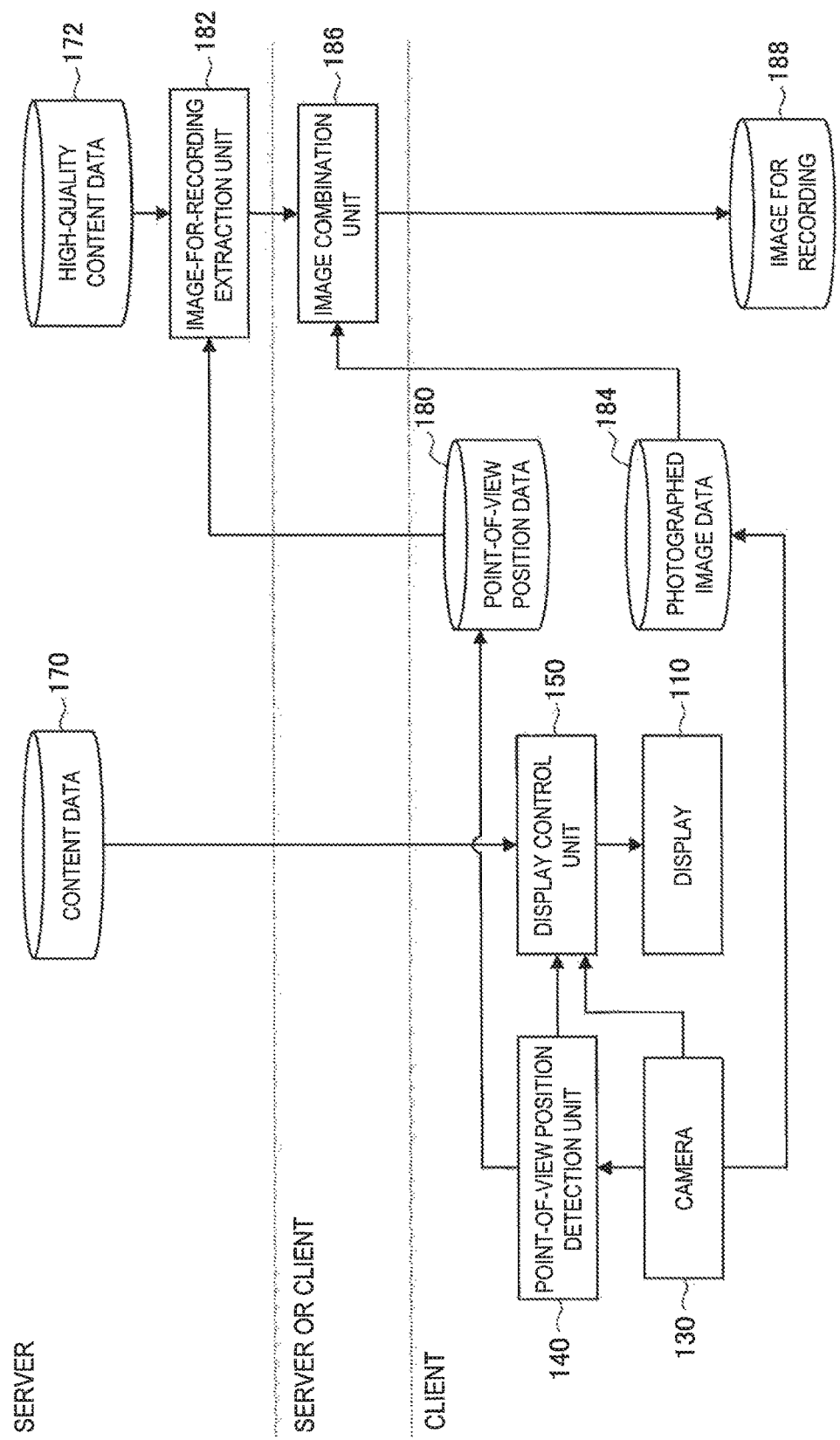

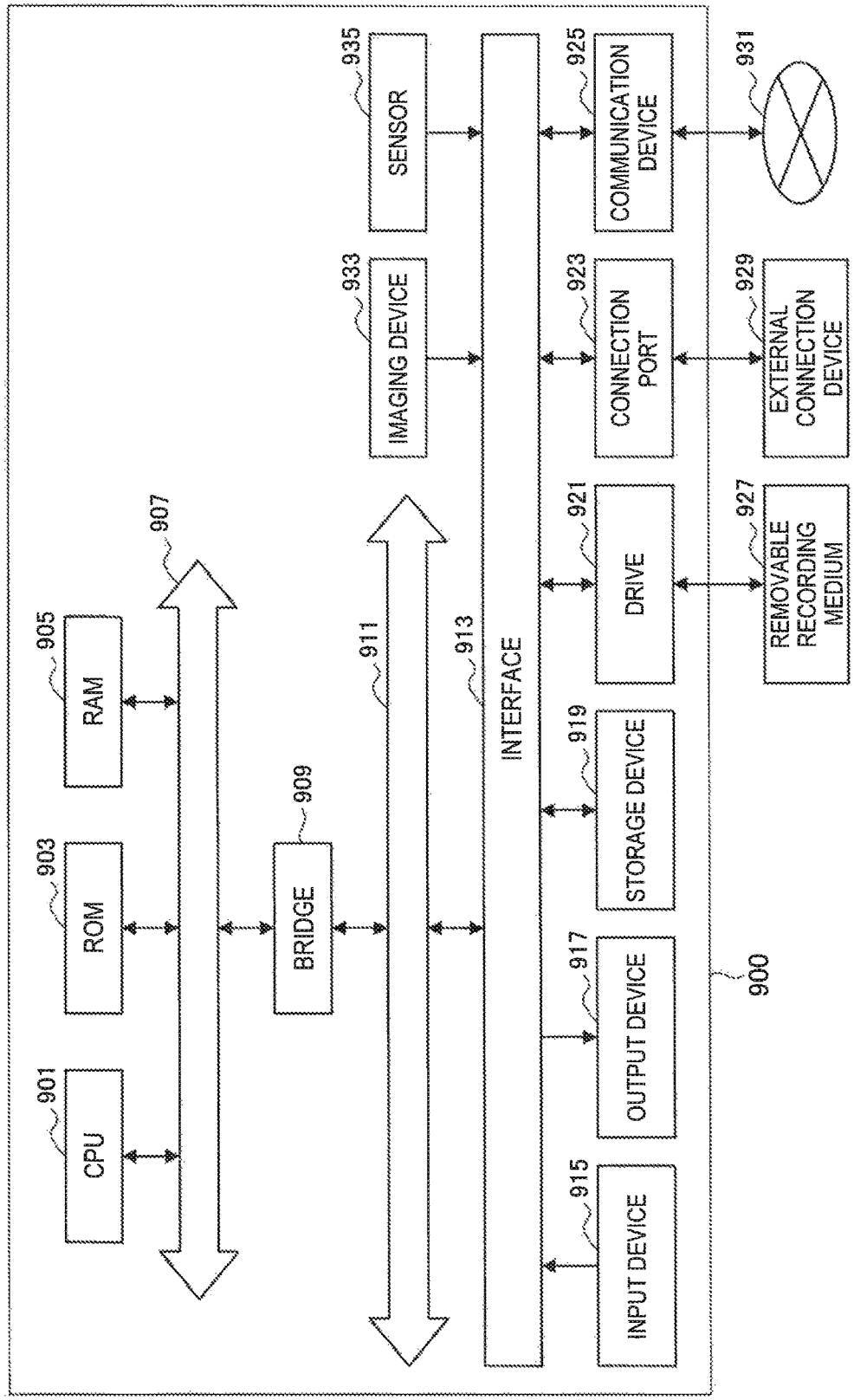

DISPLAY CONTROL APPARATUS, DISPLAY CONTROL METHOD, AND PROGRAM

CROSS-REFERENCE TO PRIOR APPLICATION

This application is a continuation of U.S. patent application Ser. No. 14/433,073 (filed on Apr. 2, 2015), which is a National Stage Patent Application of PCT International Patent Application No. PCT/JP2013/078592 (filed on Oct. 22, 2013) under 35 U.S.C. § 371, which claims priority to Japanese Patent Application No. 2012-269191 (filed on Dec. 10, 2012), which are all hereby incorporated by reference in their entirety.

TECHNICAL FIELD

The present invention relates to a display control apparatus, a display control method, and a program.

BACKGROUND ART

In recent years, a technology called augmented reality (AR) has been attracting attention. AR is a technology to present information by superimposing the information on an image obtained by photographing a real space. In such a technology, as described in Patent Literature 1, for example, an object disposed in a three-dimensional space (the real space in a case of AR) is displayed as the image. Note that Patent Literature 1 proposes a technique of presenting information in a way that a user understands the information more easily even in a situation in which information items are clouded in the image.

CITATION LIST

Patent Literature

Patent Literature 1: JP 2012-58838A

SUMMARY OF INVENTION

Technical Problem

It has not been a long time since the above technology was developed, however. Accordingly, for example, there have not been proposed sufficient techniques of appropriately displaying a plurality of objects disposed in a space as display content items.

Thus, the present disclosure proposes a novel and improved display control apparatus, display control method, and program that enable a plurality of display content items to be displayed more appropriately.

Solution to Problem

According to the present disclosure, there is provided a display control apparatus including a state detection unit configured to detect a state of a user who observes an image, and a display control unit configured to cause a display to display the image in which a plurality of display content items are superimposed on a photographed image, and to control a behavior of each of the display content items according to the state of the user.

According to the present disclosure, there is provided a display control method including causing a display to display an image in which a plurality of display content items are superimposed on a photographed image, detecting a state of a user who observes the image, and controlling a behavior of each of the display content items according to the state of the user.

According to the present disclosure, there is provided a program for causing a computer to achieve a function of causing a display to display an image in which a plurality of display content items are superimposed on a photographed image, a function of detecting a state of a user who observes the image, and a function of controlling a behavior of each of the display content items according to the state of the user.

By controlling the behaviors of these display content items according to the state of the user who observes the plurality of c display content items, it becomes possible to display the plurality of display content items more appropriately.

Advantageous Effects of Invention

As described above, according to the present invention, it becomes possible to display a plurality of display content items more appropriately.

BRIEF DESCRIPTION OF DRAWINGS

FIG. 10 shows an example of an initial display size of object images in an embodiment of the present disclosure.

FIG. 11 shows an example of an initial display size of object images in an embodiment of the present disclosure.

FIG. 13 shows an example of object images displayed according to an eye level of a user in an embodiment of the present disclosure.

FIG. 14 shows an example of object images displayed according to an eye level of a user in an embodiment of the present disclosure.

FIG. 33 shows a configuration example in a case of recording a displayed image in an embodiment of the present disclosure.

FIG. 34 is a block diagram showing a hardware configuration of a display control apparatus.

DESCRIPTION OF EMBODIMENTS

Figure 1:
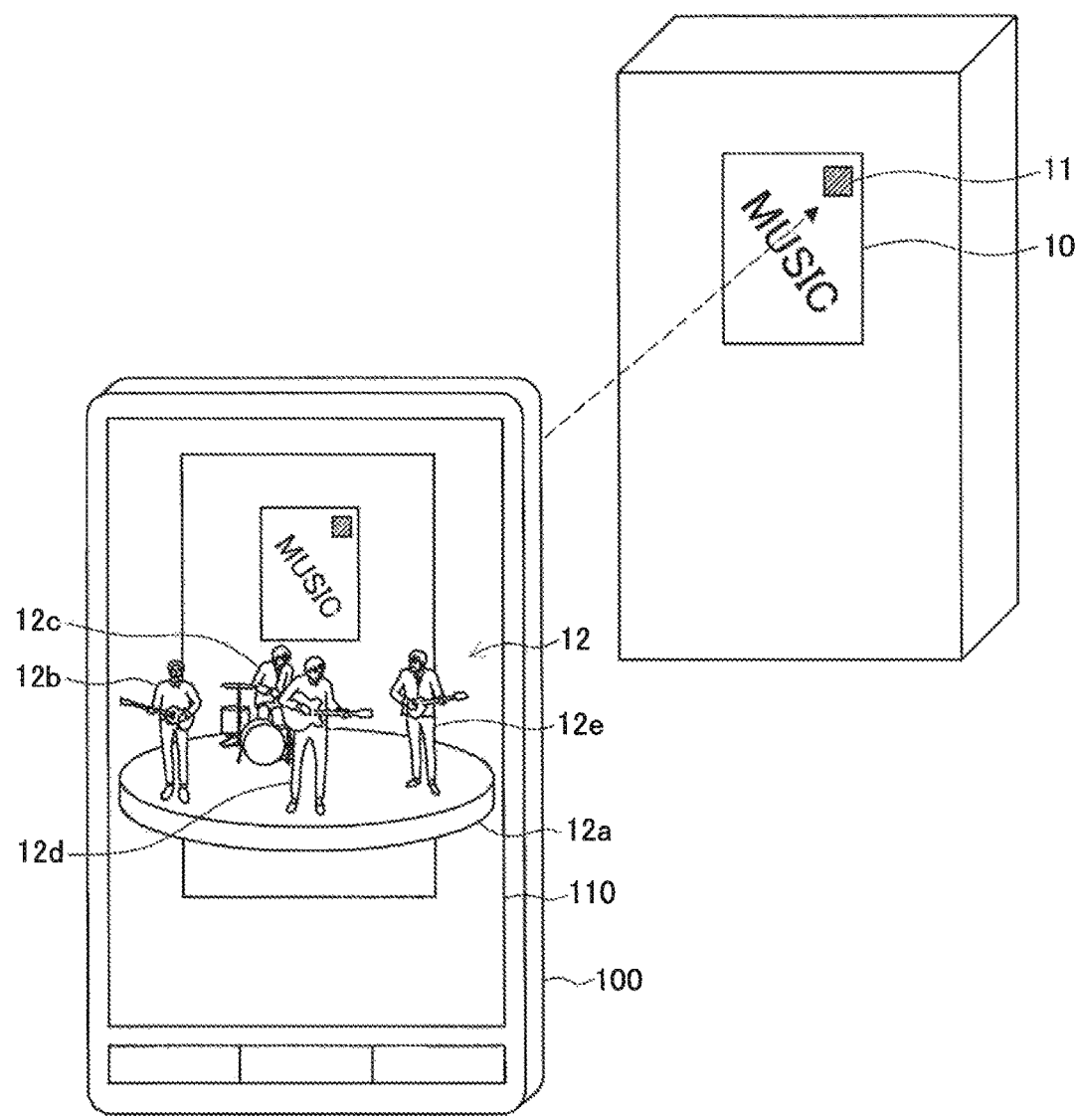
FIG. 1 shows an overview of image display according to an embodiment of the present disclosure.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that the description will be made in the following order.
1. Overview
2. Disposition of object images
3. Processing for processing load reduction
4. Setting of scale and selection of image
5. Sound processing
6. Display using SLAM
7. Use of user's attention region information
8. Use of user's point-of-view positional information
9. Functional configuration example
10. Hardware configuration
11. Supplemental remarks 1. Overview First, an overview of image display according to an embodiment of the present disclosure will be described with reference to FIG. 1.

FIG. 1 shows an overview of image display according to an embodiment of the present disclosure. Referring to FIG. 1, a terminal apparatus 100 (such as a smartphone, a personal computer (PC), or a mobile game machine) photographs a real space including a poster 10 by using an incorporated camera. Here, the poster 10 includes a marker 11. The terminal apparatus 100 causes a display 110 to display the image obtained through photographing as a through image, recognizes the marker 11 included in the image, acquires object images 12 from a server by using information shown by the marker 11, and causes the display 110 to display the object images 12 by superimposing the object images 12 on the through image.

In the shown example, object images 12a to 12e are displayed. The object image 12a is an image that displays a stage disposed in a space in front of the poster 10, and the object images 12b to 12e are images that display members of a band that is performing on stage. In this manner, the image displayed on the display 110 of the terminal apparatus 100 is an image including a plurality of display content items (object images 12a to 12e) that display a plurality of objects (the stage and the band members) whose display positions are defined in a space (the real space).

2. Disposition of Object Images

Next, the disposition of object images in an embodiment of the present disclosure will be described with reference to FIG. 2 to FIG. 5. In the above image display, a user photographs the poster 10 with the terminal apparatus 100 from various angles so as to display the object images 12. In addition, since the terminal apparatus 100 can be moved easily, in a state in which the object images 12 are displayed, the orientation of the terminal apparatus 100 or the positional relation between the terminal apparatus 100 and the poster 10 may change in many cases.

In such a case, for example, if the object images 12 are displayed in the same manner regardless of the orientation of the terminal apparatus 100 or the positional relation between the terminal apparatus 100 and the poster 10, for example, even when attention is paid to a specific part in the object images 12 and a camera of the terminal apparatus 100 approaches that part, the display will not change, resulting in diminishing the reality.

For example, it may be possible to set the whole object images 12 as one multi-view image so as to switch the displayed image to a different point-of-view image according to the positional relation between the terminal apparatus 100 and the poster 10. However, in many cases, the terminal apparatus 100 that displays the object images 12 does not have a high processing capacity, so that this method is not realistic. The present embodiment enables realistic display of the object images 12 by using a more practical method.

Figure 2:
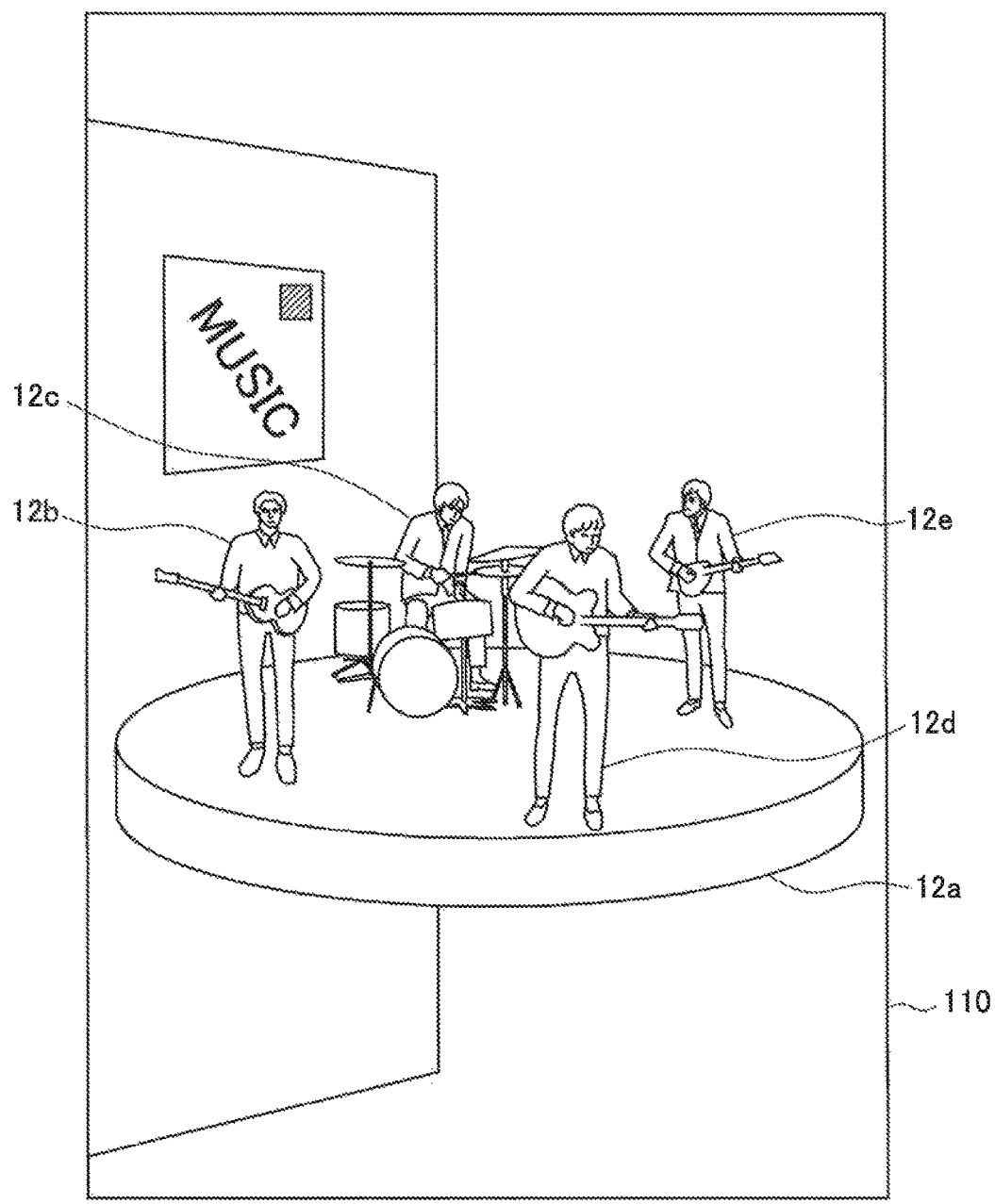
FIG. 2 shows the image in the example of FIG. 1 when seen from the left side.

FIG. 2 shows the image in the example of FIG. 1 when seen from the left side. In the present embodiment, for each of the objects, a relative display position on the basis of the marker 11 in the real space is defined, and each of the object images 12 is superimposed and displayed as a layered image that is disposed corresponding to the display position of each of the objects. Accordingly, in a case in which the user observes the image from the left side of the poster 10, the object image 12b that displays the member standing on the left side of the stage, that is, at a position closer to the terminal apparatus 100, is displayed as a large figure in a forward part. At the same time, the object image 12e that displays the member standing on the right side of the stage, that is, at a position more distant from the terminal apparatus 100, is displayed as a small figure in a backward part.

Figure 3:
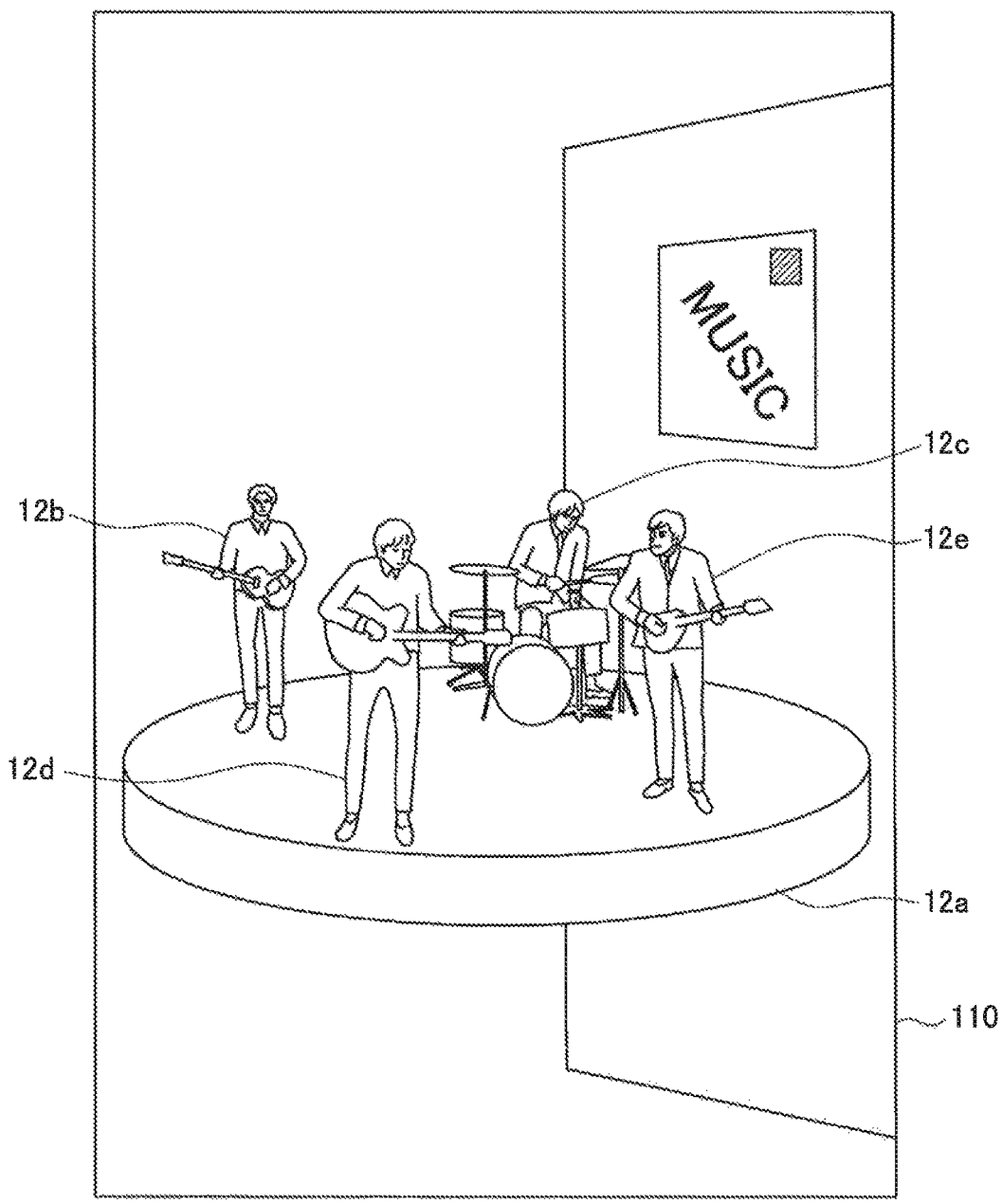
FIG. 3 shows the image in the example of FIG. 1 when seen from the right side.

FIG. 3 shows the image in the example of FIG. 1 when seen from the right side. In contrast to the example of FIG. 2, in a case in which the user observes the image from the right side of the poster 10, the object image 12e that displays the member standing on the right side of the stage, that is, at a position closer to the terminal apparatus 100, is displayed as a large figure in a forward part. At the same time, the object image 12b that displays the member standing on the left side of the stage, that is, at a position more distant from the terminal apparatus 100, is displayed as a small figure in a backward part. Further, the right and left positional relation between the object image 12d that displays the member in the center (playing the guitar) and the object image 12c that displays the member in the backward (playing the drums) is opposite to that in the example of FIG. 2.

Figure 4:
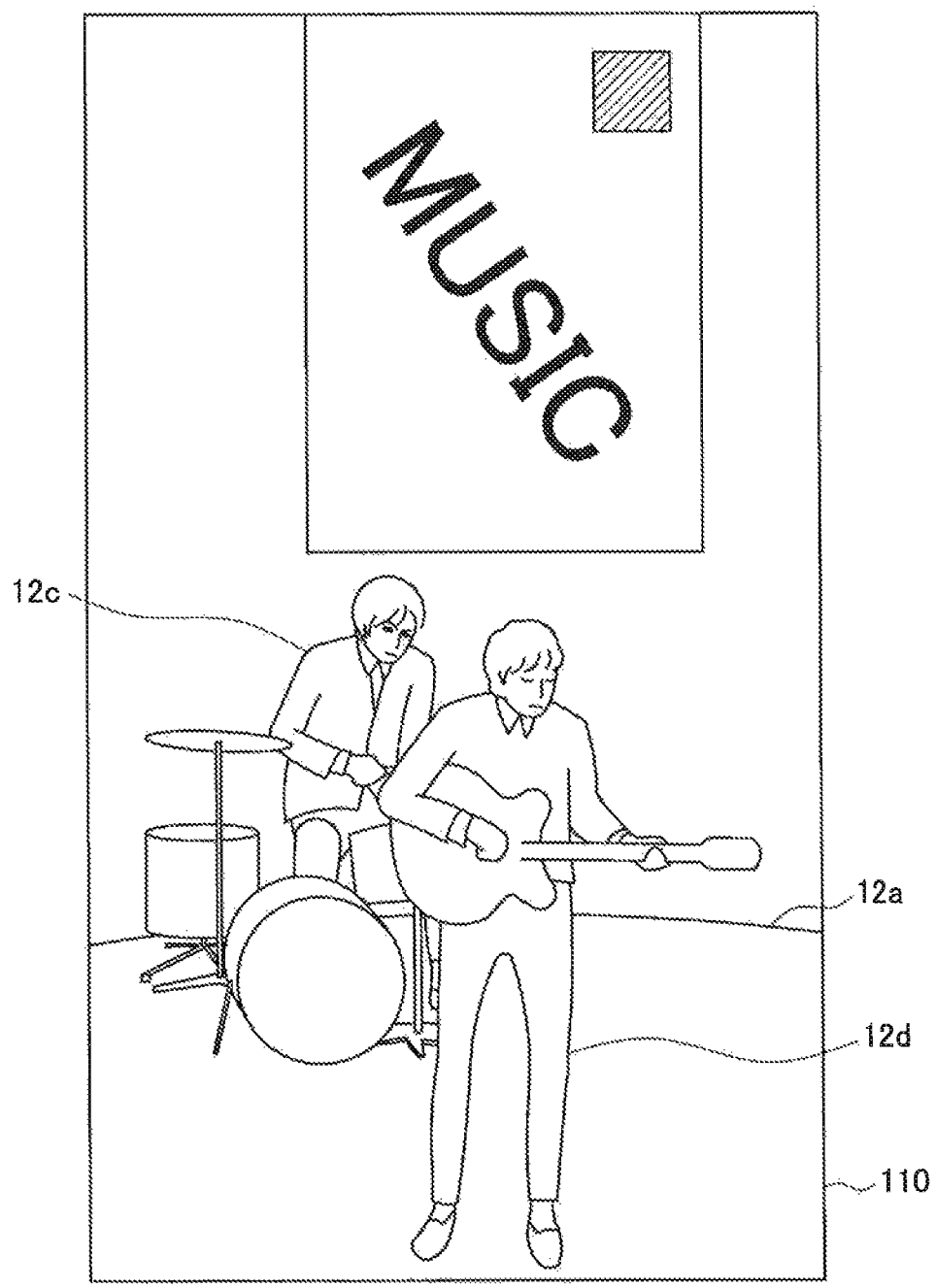
FIG. 4 shows the image in the example of FIG. 1 in close-up.

FIG. 4 shows the image in the example of FIG. 1 in close-up. When the user approaches the image, the distance between the display positon of each object and the terminal apparatus 100 becomes shorter. In the present embodiment, in such a case, in the same manner as in the case in which the user approaches real objects, the objects are displayed in an enlarged manner. In the shown example, the object images 12c and 12d that display two members around the center of the object images 12 are displayed in an enlarged manner. At the same time, since the distance becomes shorter, the display range of the images becomes narrower, so that the object images 12b and 12e that display other two members are not within the display range.

Figure 5:
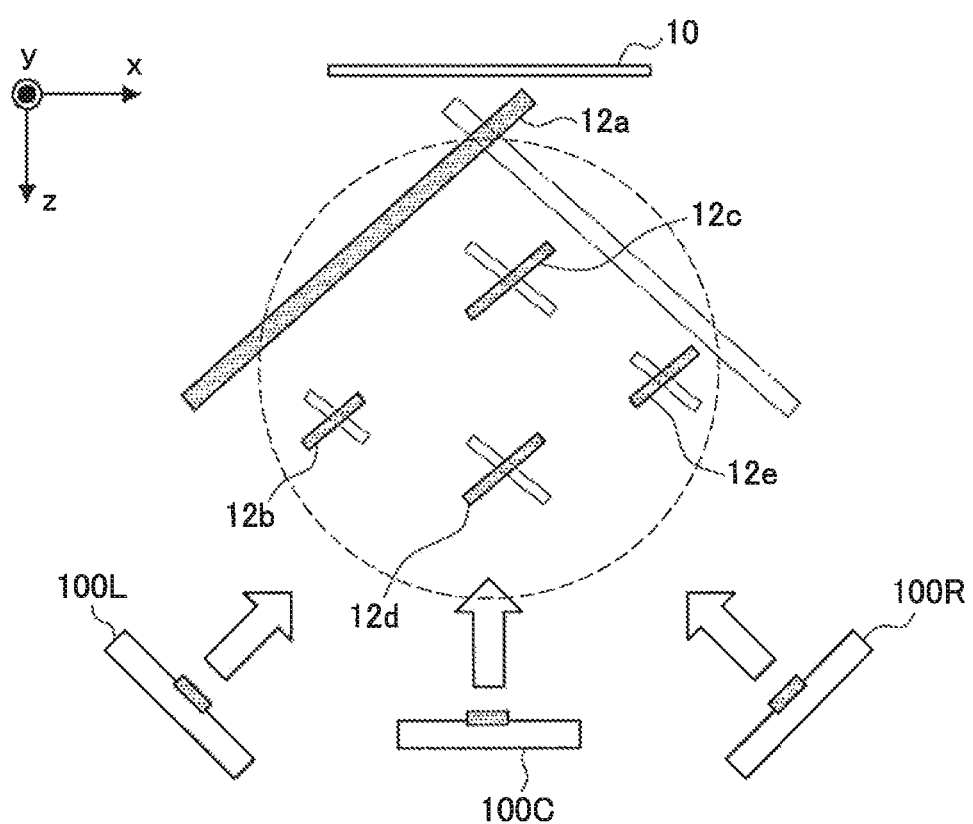
FIG. 5 shows the examples shown in FIG. 2 to FIG. 4 conceptually.

FIG. 5 shows the examples shown in FIG. 2 to FIG. 4 conceptually. As described above, in the present embodiment, for each object, the display position in the real space on the basis of the poster 10 is defined. In FIG. 5, the position defined for each object is expressed by a coordinate system in which the right and left direction is x-axis, the vertical direction is y-axis, and the front and back direction is z-axis. However, the definition of positions of the objects is not limited to this example and any coordinate system can be used.

In this embodiment, the object images 12 are displayed as a two-dimensional image for which AlphaChannel is set. That is, in the present embodiment, the object images 12 are a layered image that is transparent except for parts that display the objects so as to transmit the other object images located backward. Note that the transmitting parts in each of the object images are not shown.

According to the movement of the position of the user's point of view, the object images 12 are displayed in a rotating manner on the basis of the display position of the corresponding object (in the shown example, the rotation is around the y-axis). Thus, regardless of the movement of the position of the point of view, the object displayed by each of the object images 12 faces the position of the point of view (the position of the terminal apparatus 100). In FIG. 5, the state in which the object images 12 face a terminal apparatus 100R is shown by a solid line, and the state in which the object images 12 face a terminal apparatus 100L is shown by a virtual line. As is clear from FIG. 5, the superposed order of the layers of the object images 12 is different between the display with respect to the terminal apparatus 100R and the display with respect to the terminal apparatus 100L.

Further, in FIG. 5, the terminal apparatus 100 in the example of FIG. 2 is shown as the terminal apparatus 100L, the terminal apparatus 100 in the example of FIG. 3 is shown as the terminal apparatus 100R, and the terminal apparatus 100 in the example of FIG. 4 is shown as the terminal apparatus 100C. When displaying images in the present embodiment, the positions of these terminal apparatuses 100 (the positions of the user's points of view) are defined in the same manner as the positions of the object images 12, for example. The position of the point of view can be specified by, on the basis of the size and shape of the marker 11 appearing in the image photographed by the camera, for example, calculating the distance from the terminal apparatus 100 to the poster 10 or the angle (the horizontal direction/ the vertical direction) of the terminal apparatus 100 with respect to the poster 10. Note that the angle of the terminal apparatus 100 may be specified by the results of detection by a sensor included in the terminal apparatus 100, such as an acceleration sensor or a magnetic field sensor, and positional information of the poster 10 that is registered in advance.

In this manner, each of the object images 12 has a three-dimensional position and the appearance thereof changes according to the position of the point of view while keeping the mutual positional relation. Thus, the user can enjoy the reality of the image displayed as the object images 12, as if the user is viewing real objects.

Note that the example shown in FIG. 5 is just an example, and another configuration may be employed to achieve the display shown in FIG. 2 to FIG. 4. For example, the object images 12 may be a multi-view image whose display changes according to the mutual angle between each of the object images 12 and the terminal apparatus 100. Further, as will be described later, for example, the facing display of two-dimensional images and the display of the multi-view image may be switched by a certain condition.

3. Processing for Processing Load Reduction

Next, processing for processing load reduction in an embodiment of the present disclosure will be described with reference to FIG. 6 to FIG. 9. In many cases, the terminal apparatus 100 that executes processing of image display according to an embodiment of the present disclosure does not have a high processing capacity, and accordingly, a reduction in the processing load is demanded for image display.

3-1. First Example

Figure 6:
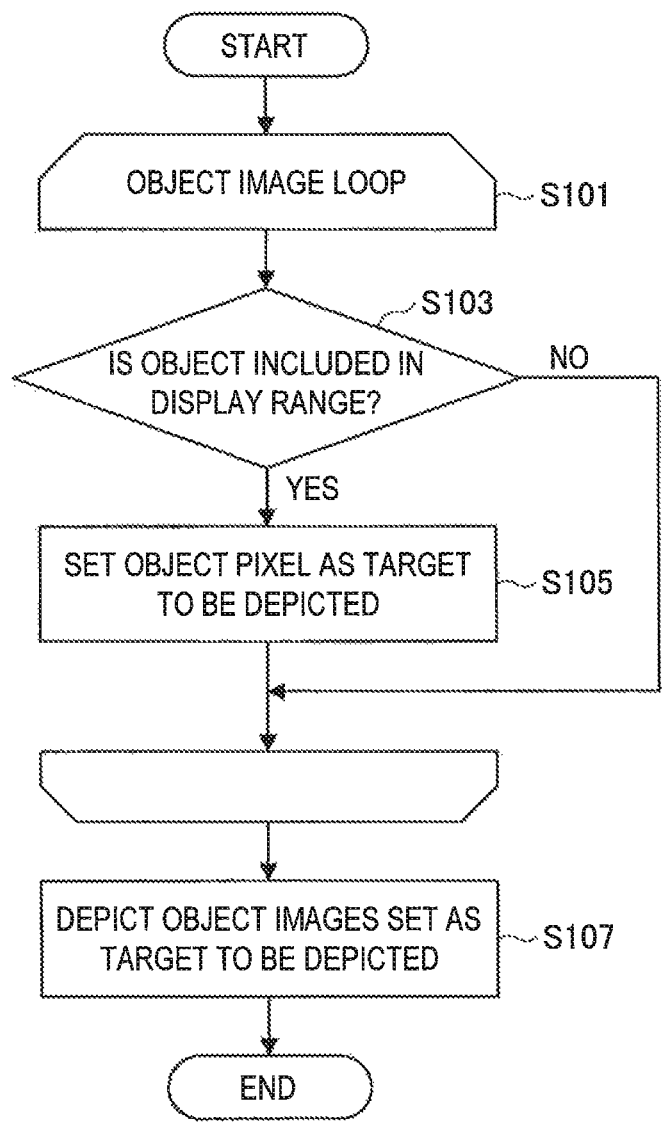
FIG. 6 is a flowchart showing a first example of processing for load reduction in an embodiment of the present disclosure.

FIG. 6 is a flowchart showing a first example of processing for load reduction in an embodiment of the present disclosure. In the first example, as in the case shown in FIG. 4, for example, in a case in which some objects are not included in the display range by the movement of the position of the user's point of view, by refraining from depicting an image that displays those objects, the processing load is reduced.

In the processing, first, in the terminal apparatus 100, determination processing is executed for each the object image (step S101). Here, it is determined whether or not an object displayed by a corresponding object image is included in the display range (step S103). The determination of whether or not the object is included in the display range may be performed on the basis of information on the position (the position of the point of view) of the camera of the terminal apparatus 100, which is specified from the shape of the marker 11 included in the photographed image, for example.

In the determination in the step S103, when it is determined that the object is included in the display range (YES), the object image that displays this object is set as a target to be depicted (step S105). Meanwhile, when it is determined that the object is not included in the display range (NO), the object image is not set as the target to be depicted.

After the above determination processing for each object image, depicting processing is executed for the object images that are set as the target to be depicted (step S107). In the depicting processing here, the target is the object images whose objects are included in the display range. Accordingly, in a case in which some objects are not included in the display range as in the case shown in FIG. 4, for example, the processing load is lower than that in the depicting processing that targets all the object images. Note that the "depicting processing" in this specification may include decoding processing.

3-2. Second Example

In a second example, in a case in which the relation between the position of the user's point of view and the display position of the object changes as in the case shown in FIG. 2 to FIG. 4, for example, the quality of the object image 12 that displays the object having a display position closer to the position of the point of view is increased. The object having a display position closer to the position of the point of view is assumed to be an object that is more outstanding for the user or to which the user is paying attention. Accordingly, the display of such an object with high quality can efficiently increase the quality of the entire image enjoyed by the user.

As another method to increase the quality of the object image, the number of points of view corresponding to the object image may be increased. More specifically, for example, the image displayed as the object image may be switched between the two-dimensional image in which the facing display is performed as described with reference to FIG. 5 and a multi-view image. In the two-dimensional image (single-view image), an image of the object seen from a single point of view is used regardless of the position of the point of view; in contrast, in the multi-view image, images of the object seen from multiple points of view are prepared and used selectively according to the angle of the line of sight from the position of the point of view toward the object.

Accordingly, in a case of displaying the multi-view image as the object images 12 in the example of FIG. 5, for example, different object images 12 may be displayed in a case in which the position of the point of view is in the diagonally forward left (the case of the terminal apparatus 100L) and in a case in which the position of the point of view is in the diagonally forward right (the case of the terminal apparatus 100R). In this manner, when the multi-view image is displayed as the object image, the object is displayed in different orientations according to the position of the user, and accordingly, the user can enjoy more reality in the image. However, in a case in which the multi-view image is displayed as the object image, the processing load for the decoding or the depicting of the image is higher than in a case of displaying the two-dimensional image.

Accordingly, for example, if the object image of the object that is more outstanding for the user or to which the user may be paying attention is displayed by the multi-view image and object images of the other objects are displayed by the two-dimensional images, according to the relation between the position of the user's point of view and the display positions of the objects, the processing load can be suppressed.

Note that the object image before and after switching is not limited to the two-dimensional image (single-view image) and the multi-view image as in the above example. As another example, the switching may be performed between multi-view images (an image that corresponds to less points of view and an image that corresponds to more points of view).

Further, as another example of a method to increase the quality of the object image, the resolution of the object image may be increased. If the resolution of the object image is increased, the object is displayed in more detail, but the processing load for the decoding or the depicting of the image will be increased. Accordingly, for example, if the resolution of the object image of the object that is more outstanding for the user or to which the user may be paying attention is increased and the resolution of object images of the other objects is kept to be low, according to the relation between the position of the user's point of view and the display positions of the objects, the processing load can be suppressed.

Note that in a case of changing the resolution of the object image, if a plurality of object images that display the same object with different resolutions are prepared, it is possible to switch the selection of the image from among these images. Alternatively, the "case of changing the resolution" may also include the change of substantial resolution by ON/OFF of a loop filter at the time of the depicting processing, ON/OFF of a post process such as deblocking filtering or unsharp masking, a sub-sample of a texture to be depicted, or the like.

Figure 7:
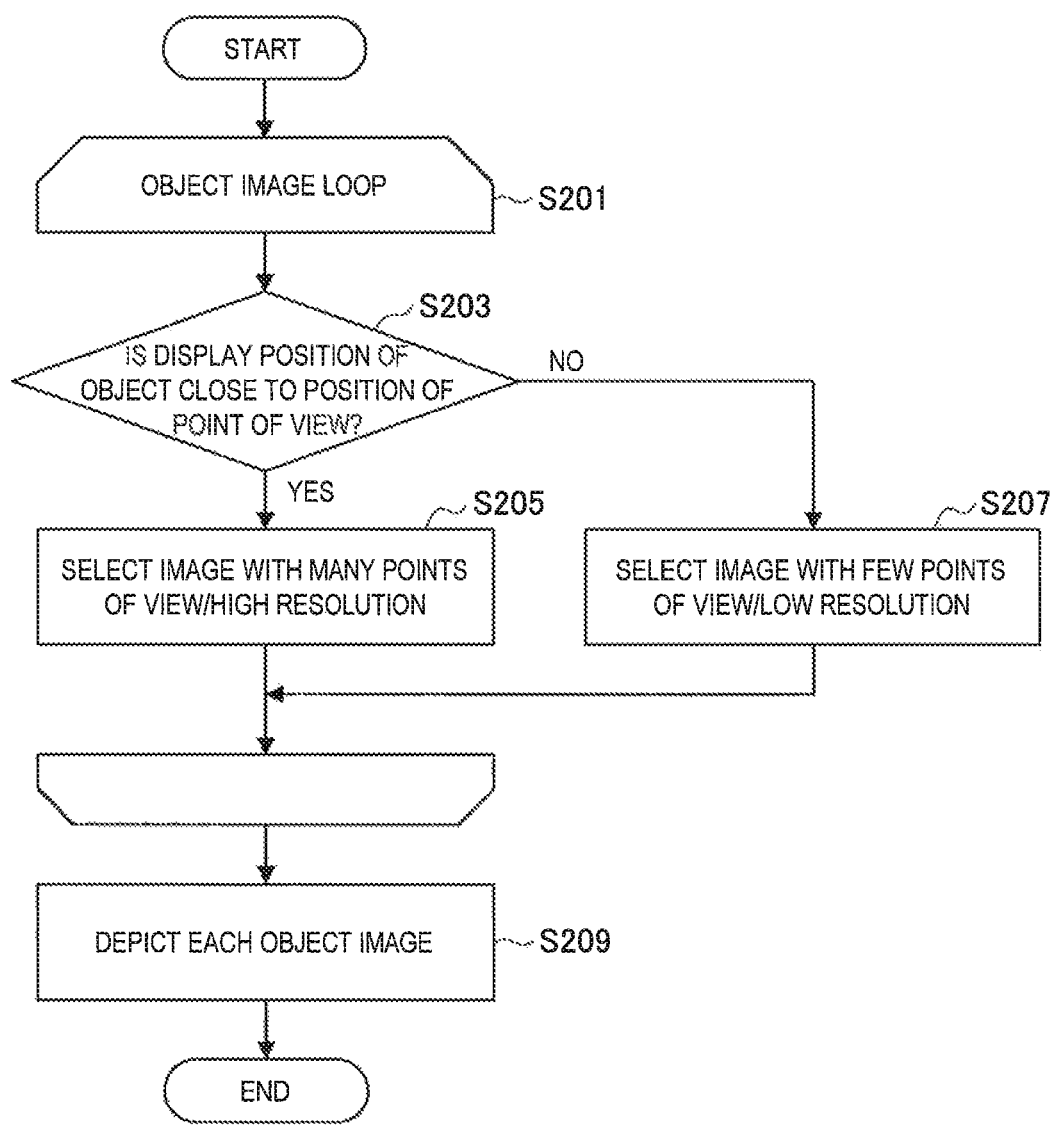
FIG. 7 is a flowchart showing a second example of processing for load reduction in an embodiment of the present disclosure.

FIG. 7 is a flowchart showing the second example of processing for load reduction in an embodiment of the present disclosure. In the processing, first, in the terminal apparatus 100, determination processing is executed for each object image (step S201). Here, it is determined whether or not the display position of the object displayed by a corresponding object image is close to the position of the point of view (step S203). The display position and the position of the point of view used in this determination may be those defined in the example described with reference to FIG. 5. The determination of whether the positions are close or not may be performed on the basis of whether or not a calculated distance is smaller than a predetermined threshold, for example.

In the determination in the step S203, when it is determined that the display position is close to the position of the point of view (YES), an image with many points of view/high resolution is selected as the object image that displays the object (step S205). Meanwhile, when it is determined that the display position is not close to the position of the point of view (NO), an image with a few points of view/low resolution is selected as the object image that displays the object (step S207).

After the above determination processing for each object image, depicting processing is executed for each object image (step S209). In the depicting processing here, although the processing load is high for the object image whose display position is close to the position of the point of view because the depicting is performed with many points of view/high resolution, the processing load can be suppressed for the other object images because the depicting is performed with a few points of view/low resolution.

Note that, in the second example, one or both of the change in the number of points of view of the object image and the change in the resolution of the object image may be performed. That is, the object image that displays the object having the display position close to the position of the point of view may be depicted by an image with many points of view and high resolution. Further, the number of points of view and the resolution may be switched, not only in two stages as shown in FIG. 7 (according to whether or not the display position is close to the position of the point of view), but also in three or more stages (for example, according to the degree of closeness of the display position to the position of the point of view).

Further, the above second example may be combined with the first example. In this case, for example, after the determination of whether or not the object image is set as the target to be depicted according to whether or not the object is included in the display range, the number of points of view or the resolution of the object image that is set as the target to be depicted can be set according to the relation between the display position of the object and the position of the user's point of view.

3-3. Third Example

Figure 8:
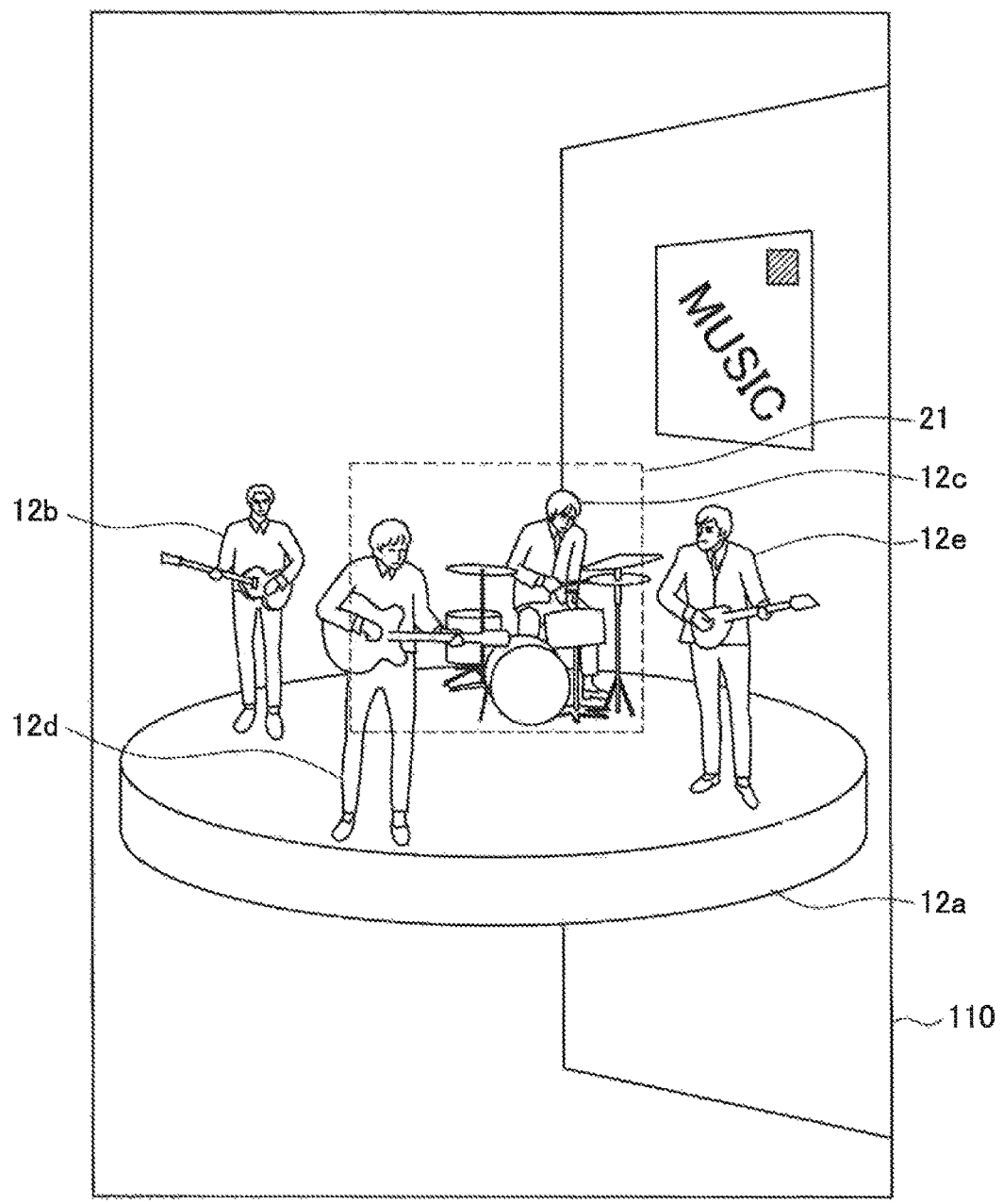
FIG. 8 shows an attention region in an embodiment of the present disclosure.

FIG. 8 shows an attention region in an embodiment of the present disclosure. In the present embodiment, for example, in addition to the display range shown in the first example and the positional relation between the object and the user, which is shown in the second example, a user's attention region in the image can be used for the processing for load reduction.

In the shown example, an attention region 21 is set around the center of the image displayed on the display 110. In the present embodiment, the user can observe the object images 12 from any angle by moving the terminal apparatus 100, and as a result of the movement, the region located at the center of the display 110 is assumed to be the region to which the user is paying attention. In this case, the attention region 21 includes the object images 12*c* and 12*d*. Accordingly, the user is assumed to be paying attention to the object images 12*c* and 12*d*.

As another example, in a case in which the terminal apparatus 100 is a head mounted display, for example, the attention region may be specified by detection of the user's line of sight. Further, as in a later described example, in a case in which the user can take a certain action to a specific position in the image displayed on the display 110, a region including the position as the target of the action may be specified as the attention region.

Figure 9:
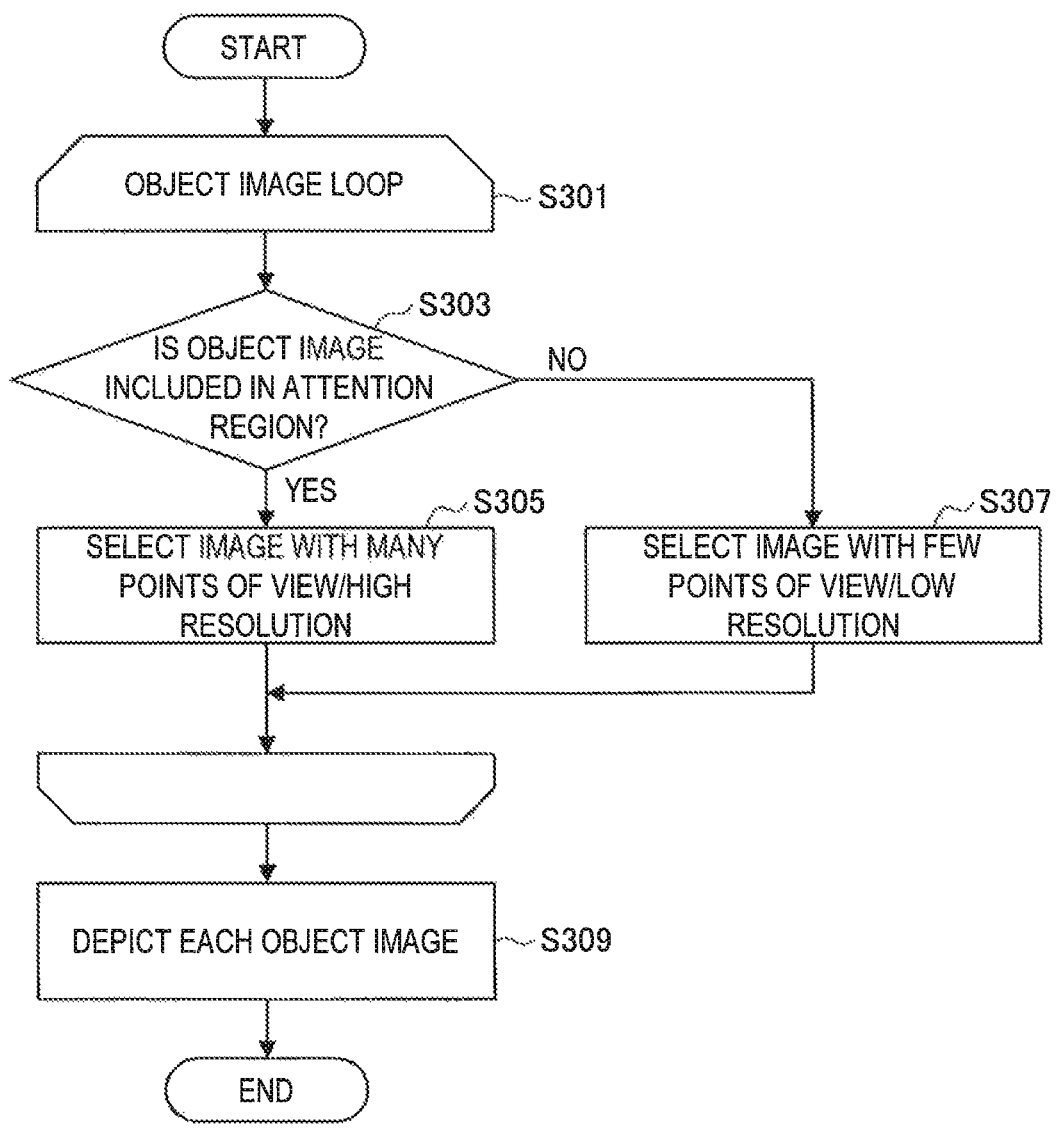
FIG. 9 is a flowchart showing a third example of processing for load reduction in an embodiment of the present disclosure.

FIG. 9 is a flowchart showing the third example of processing for load reduction in an embodiment of the present disclosure. In the third example, on the basis of the above described user's attention region, the quality of the object image that is assumed to be a region to which the user is paying attention is increased. Thus, it becomes possible to efficiently increase the quality of the entire image enjoyed by the user. Note that, as a specific method to further increase the quality of the object image, for example, the number of points of view may be changed or the resolution may be switched as in the above second example.

In the processing, first, in the terminal apparatus 100, determination processing is executed for each object image (step S301). Here, it is determined whether or not each of the object images is included in the attention region (step S303). The attention region used in this determination may be a region that is set as a predetermined region, such as the region around the center of the display unit as in the example shown in FIG. 8.

In the determination in the step S303, when it is determined that the object image is included in the attention region (YES), an image with many points of view/high resolution is selected as the object image (step S305). Meanwhile, when it is determined that the object image is not included in the attention region (NO), an image with a few points of view/low resolution is selected as the object image (step S307).

After the above determination processing for each object image, depicting processing is executed for each object image (step S309). In the depicting processing here, although the processing load is high because the object image to which the user is assumed to be paying attention is depicted with many points of view/high resolution, the processing load can be suppressed for the other object images because the depicting is performed with a few points of view/low resolution.

Note that, in the third example, one or both of the switch of the number of points of view of the object image and the switch of the resolution of the object image may be performed. That is, the object image included in the attention region may be depicted with many points of view and high resolution. Further, the number of points of view and resolution may be switched, not only in two stages as shown in FIG. 9 (according to whether or not the object image is included in the attention region), but also in three or more stages (for example, according to how much of a part of the object image is included in the attention region).

Further, the third example may be combined with the first example and/or the second example. In this case, for example, after the determination of whether or not an object image is set as the target to be depicted according to whether or not the object is included in the display range, as shown in the first example, the number of points of view and the resolution of the object image that is set as the target to be depicted may be set according to the relation with the attention region. Alternatively, the number of points of view or the resolution may be set by determination using an index that is calculated on the basis of both of the relation between the display position of the object and the position of the user's point of view and the relation between the object image and the attention region.

For example, in a case in which the object image as the target to be depicted is specified by the above first example, according to the number of object images that are set as the target to be depicted, the resolution and the number of points of view of each object image may be decided. This is also regarded as processing of distributing usable resources for image depicting by the object image that is set as the target to be depicted. Accordingly, as the number of object images that are set as the target to be depicted is large, the resolution is lower and the number of points of view is fewer. In contrast, as the number of object images that are set as the target to be depicted is small, the resolution is higher and the number of points of view is more. In this case, furthermore, the determination shown in the second example or the third example may be performed between the object images that are set as the target to be depicted, and the resources may be distributed preferentially to the object image to which the user is paying attention.

4. Setting of Scale and Selection of Image

Next, setting of scale and selection of an image in an embodiment of the present disclosure will be described with reference to FIG. 10 to FIG. 15.

For example, when displaying the image shown in FIG. 1, the poster 10 used as the basis of the display positions of the object images 12 and the terminal apparatus 100 used by the user to observe the image included in the object images 12 may have various positional relations. In an example, the poster 10 is pasted in a public area, and when a user passing by the area directs the camera of the terminal apparatus 100 to the poster 10, the display 110 displays the object images 12.

In this case, depending on the position at which the poster 10 is pasted or the position from which the user observes the poster 10, the distance between the poster 10 and the terminal apparatus 100 and the angle of the terminal apparatus 100 with respect to the poster 10 differ.

(4-1. Setting of Scale)

For example, in a case of the user observing the poster 10 attached on a bulletin board at close range and in a case of the user observing the poster 10 from a distance across a street, for example, the distance between the poster 10 and the terminal apparatus 100 differs largely, and the size of the marker 11 included in an image photographed by the camera of the terminal apparatus 100 also differs largely. Here, if the size of the marker 11 included in the photographed image is in proportion to the display size of the object images 12, it may be difficult for the user to view the object images 12 because the object images 12 may be too large or too small. On the other hand, if the display size of the object images 12 is constant regardless of the size of the marker 11 included in the photographed image, the display size of the object images 12 will not change even when the user approaches or step away from the marker 11, resulting in diminishing the reality.

Accordingly, in an embodiment of the present disclosure, as a procedure of setting the display size of the object images 12, when the object images 12 are displayed first in the terminal apparatus 100, more specifically, when an application that causes the object images 12 to be displayed, for example, is started, according to the distance from the terminal apparatus 100 (the position of the point of view) to the marker 11 at that time, the scale of disposition of the display position of each object displayed by the object images 12 and the initial display size of the object images 12 are decided. After that, on the basis of the initial display size, according to changes in the size of the marker 11 included in the photographed image, the display size of the object images 12 is changed. The ratio between the change in the size of the marker 11 included in the photographed image and the change in the size of the object images 12 after the decision of the initial display size may be constant regardless of the initial display size.

FIG. 10 and FIG. 11 each show an example of the initial display size of the object images in an embodiment of the present disclosure. FIG. 10 shows object images 12s that are displayed when a poster 10s included in the photographed image is relatively small and accordingly a marker 11s is also relatively small. FIG. 11 shows object images 12b that are displayed when a poster 10b included in the photographed image is relatively big and accordingly a marker 11b is also relatively big. At this time, according to the change in the display size of the object images 12, the scale of disposition of the display position of each object is also changed. More specifically, the display position of each object is disposed at a larger interval in the object images 12s than in the object images 12b.

As shown in FIG. 10 and FIG. 11, the size of the marker 11b included in the photographed image is about twice as big as that of the marker 11s, whereas the size of the object images 12b is a little bigger than, but is almost the same as, that of the object images 12s. In this manner, in the present embodiment, the initial display size of the object images 12 is decided so as not to decrease the visibility of the object images 12 because the variation of the size of the object images 12 according to the size of the marker 11 included in the photographed image is too large.

Figure 12:
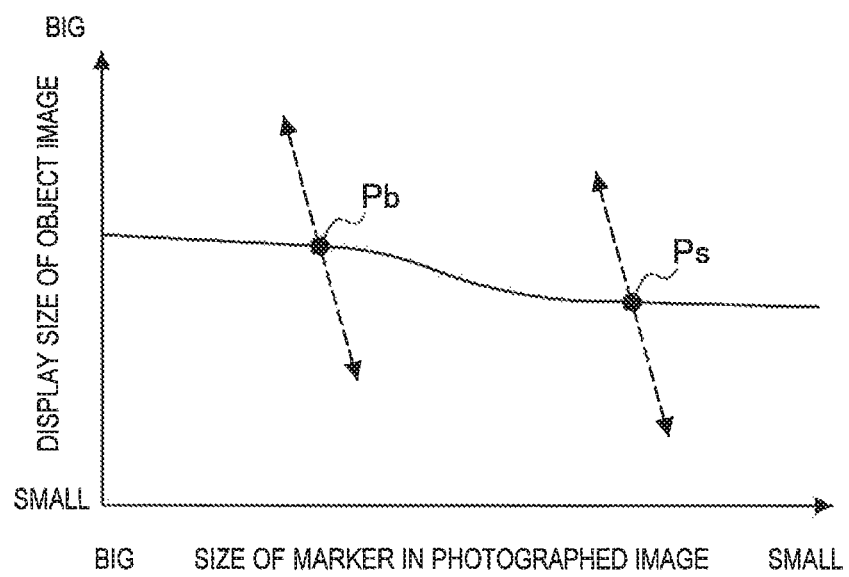
FIG. 12 is a graph showing a setting example of a display size of object images in an embodiment of the present disclosure.

FIG. 12 is a graph showing a setting example of a display size of the object images in an embodiment of the present disclosure. The solid line in the graph represents the initial display size of the object images 12, which is decided with respect to the size of the marker 11 in the photographed image. The broken lines in the graph represent changes in the display size of the object images 12, which are set according to changes in the size of the marker 11 in the photographed image, the changes being caused by the movement of the apparatus 100, for example, after the decision of the initial display size of the object images 12. Note that a point Ps in FIG. 12 corresponds to the example shown in FIG. 10 and a point Pb in FIG. 12 corresponds to the example shown in FIG. 11.

In the shown example, the setting of the initial display size of the object images 12 as described above with reference to FIG. 10 and FIG. 11 is achieved by suppressing the change in the initial display size with respect to the size of the marker 11 in a case in which the size of the marker 11 in the photographed image is big (the left side of the graph) and in a case in which the size of the marker 11 in the photographed image is small (the right side of the graph). In this case, the size of the object images 12 is somewhat changed, but not largely, depending on whether the marker 11 in the photographed image is small or big.

Note that this shape of the graph is just an example, and any other setting is possible as long as the setting can prevent a decrease in the visibility due to a too big change or too small change in the size of the object images 12. For example, it is possible to set a constant initial display size of the object images 12 regardless of the size of the marker 11 in the photographed image. Further, it is possible to set a straight line having a gentle inclination instead of the curve shown in FIG. 12.

Meanwhile, the display size after the decision of the initial display size of the object images 12 can be changed largely depending on the change in the size of the marker 11 in the photographed image, unlike in the above decision of the initial size. In the example shown in FIG. 12, on the basis of the set initial display size (such as the size represented by the point Ps and the point Pb), when the size of the marker 11 in the photographed image becomes bigger, the size of the object images 12 becomes bigger; when the size of the marker 11 in the photographed image becomes smaller, the size of the object images 12 becomes smaller.

The graph (represented by the broken lines) showing the changes in the display size of the object images 12 in this case can have a much sharper shape than the graph (represented by the solid line) showing the changes in the initial display size. This is partly because the region in which the user can move the terminal apparatus 100 is limited in a case in which the user intends to enlarge/reduce the display of the object images 12. For example, in a case in which the user photographs the poster 10 located across a street, the user may seldom walk across the street to approach the poster 10 in order to enlarge the displayed object images 12. In the present embodiment, after the initial display size of the object images 12 is decided, by increasing the size of the object images 12 according to the changes in the size of the marker 11 included in the photographed image, such a reality that "when an object approaches, the object looks bigger; when the object steps back, the object looks smaller" is maintained.

(4-2. Selection of Image)

As another example, an elevation angle at the time when the terminal apparatus 100 (or the user who shares the point of view with the terminal apparatus 100) observes the poster 10 differs largely between when the poster 10 is pasted on a bulletin board and is observed at substantially the same level as the terminal apparatus 100 and when the poster 10 is pasted at a high position, on an external wall of a building, for example, and is observed from the ground. The object images 12 described in the above examples are each an image observed from the front, in other words, at substantially the same level. In a case in which such an image is displayed when the elevation angle is large, that is, when the user looks up at the poster 10 located at a high position, the image from the front will be displayed, although the user is looking up, and the user might feel strangeness in the display as an AR.

Accordingly, according to an embodiment of the present disclosure, when the object images 12 are displayed first in the terminal apparatus 100, more specifically, for example, when an application that causes the object images 12 to be displayed is started, according to the elevation angle (when the user is looking up) or a depression angle (when the user is looking down) of the marker 11 with respect to the terminal apparatus 100 (the position of the point of view), the orientation of each of the objects in the vertical direction, the objects being displayed as the object images 12, is decided. After that, basically, the object images 12 that are selected at the initial stage are continuously displayed; however, the user may switch the object images 12 that are to be displayed when the angle of viewing the poster 10 is changed.

Here, the elevation angle or the depression angle of the marker 11 with respect to the position of the point of view can be calculated on the basis of the shape of the marker 11 included in the photographed image, for example. Further, the results of detection by a sensor, such as an acceleration sensor included in the terminal apparatus 100, may be used together to increase the accuracy of the angel detection.

FIG. 13 and FIG. 14 each show an example of object images displayed according to the eye level of the user in an embodiment of the present disclosure. FIG. 13 shows the case in which object images 12m are displayed on the basis of a poster 10m located at substantially the same level as the terminal apparatus 100, and FIG. 14 shows the case in which object images 12h are displayed on the basis of a poster 10h located at a position higher than that of the terminal apparatus 100.

As shown in FIG. 13 and FIG. 14, in a case in which the user observes the poster 10m through the terminal apparatus 100, from the shape of the marker 11m included in the photographed image, it is determined that the elevation angle of the marker with respect to the position of the point of view is close to 0 (that is, the depression angle is also close to 0), and the object images 12m being observed from the front is displayed. In the example of the present embodiment, since the object images 12 are an image that display band members playing on stage, the object images 12m being observed from the front may be an image as if the user is watching the play of the band from a seat that is relatively distant from the stage, for example.

Meanwhile, in a case in which the user observes the poster 10h through the terminal apparatus 100, from the shape of the marker 11h included in the photographed image, it is determined that the elevation angle of the marker 11 with respect to the position of the point of view is relatively large, and the object images 12h being looked up from the lower level is displayed. The object images 12h may be an image as if the user is watching the play of the band from a position close to the stage, for example. In this manner, by changing the orientation of the objects that are displayed by the object images 12 in the vertical direction according to the eye level of the user so as to display an image being observed from the front, being looked up, or being looked down, resulting in the increase in the reality.

(4-3. Processing Flow)

Figure 15:
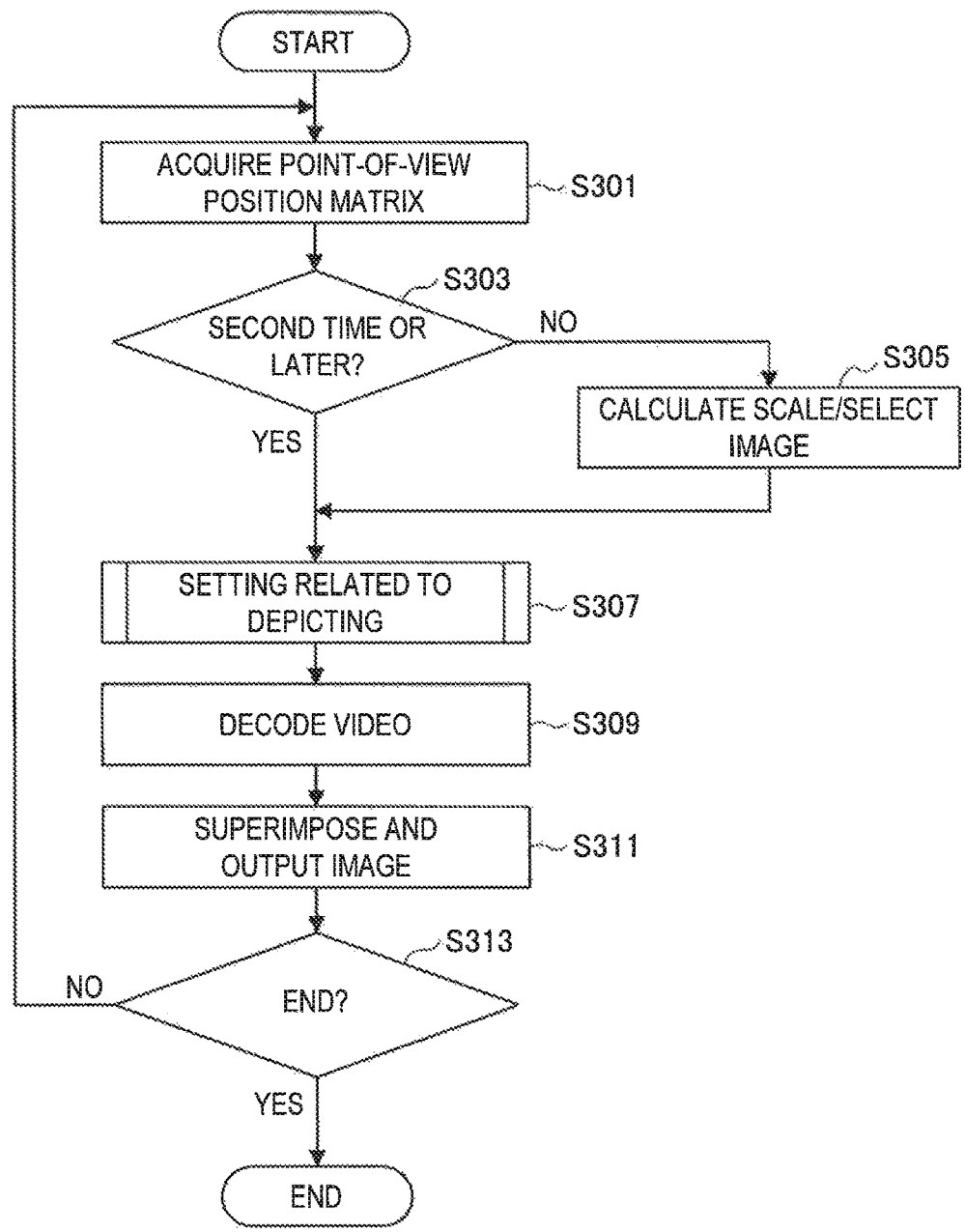
FIG. 15 is a flowchart showing an example of processing of image display in an embodiment of the present disclosure.

FIG. 15 is a flowchart showing an example of processing of image display in an embodiment of the present disclosure. The example shown in FIG. 15 includes processing of selection of an image that reflects the relation between the above setting of the scale and the user's eye level.

First, information indicating the position (the position of the point of view) of the camera of the terminal apparatus 100 is acquired as a point-of-view position matrix (step S301). The point-of-view position matrix is acquired plural times in chronological order, for example, and shows changes in the position of the camera of the terminal apparatus 100. Next, it is determined whether the acquisition of the point-of-view position matrix is the second time or later (step S303). When the acquisition is not the second time or later (NO, that is, the first time), the scale is calculated and/or the object images are selected according to the angle of the eye level in the above described manner (step S305). This corresponds to the processing "when the object images 12 are displayed first" mentioned above. Meanwhile, when the acquisition is the second time or later (YES), the processing in the step S305 is not executed.

Next, processing of setting related to depicting is executed (step S307). The processing here includes processing of limiting the target to be depicted in order to reduce the processing load and of changing the setting at the time of depicting, as in the above description with reference to FIG. 6 to FIG. 9, for example. According to the setting here, the image is decoded (step S309), and is depicted by being superimposed with the photographed image to be outputted (step S311). The above processing is repeated until ending conditions are satisfied (step S313).

5. Sound Processing

Next, an example of sound processing in an embodiment of the present disclosure will be described with reference to FIG. 16.

The example of controlling the display of the image according to the state of the user who observes the image has been described above. Similar control is possible for sound. As for sound, for example, if the same sound is reproduced regardless of the orientation of the terminal apparatus 100 and the positional relation between the terminal apparatus 100 and the poster 10, for example, even when the user pays attention to a specific part in the object images 12 and approaches the terminal apparatus 100 to that part, for example, the sound will not change, resulting in diminishing the reality. Such a situation occurs particularly when it is assumed that a sound field is formed by sounds corresponding to the individual objects (such as sounds of musical instruments played by the respective members or sound generated by outputting that sounds from a speaker on stage), for example, as in the object images 12 displaying the playing members of the band.

Figure 16:
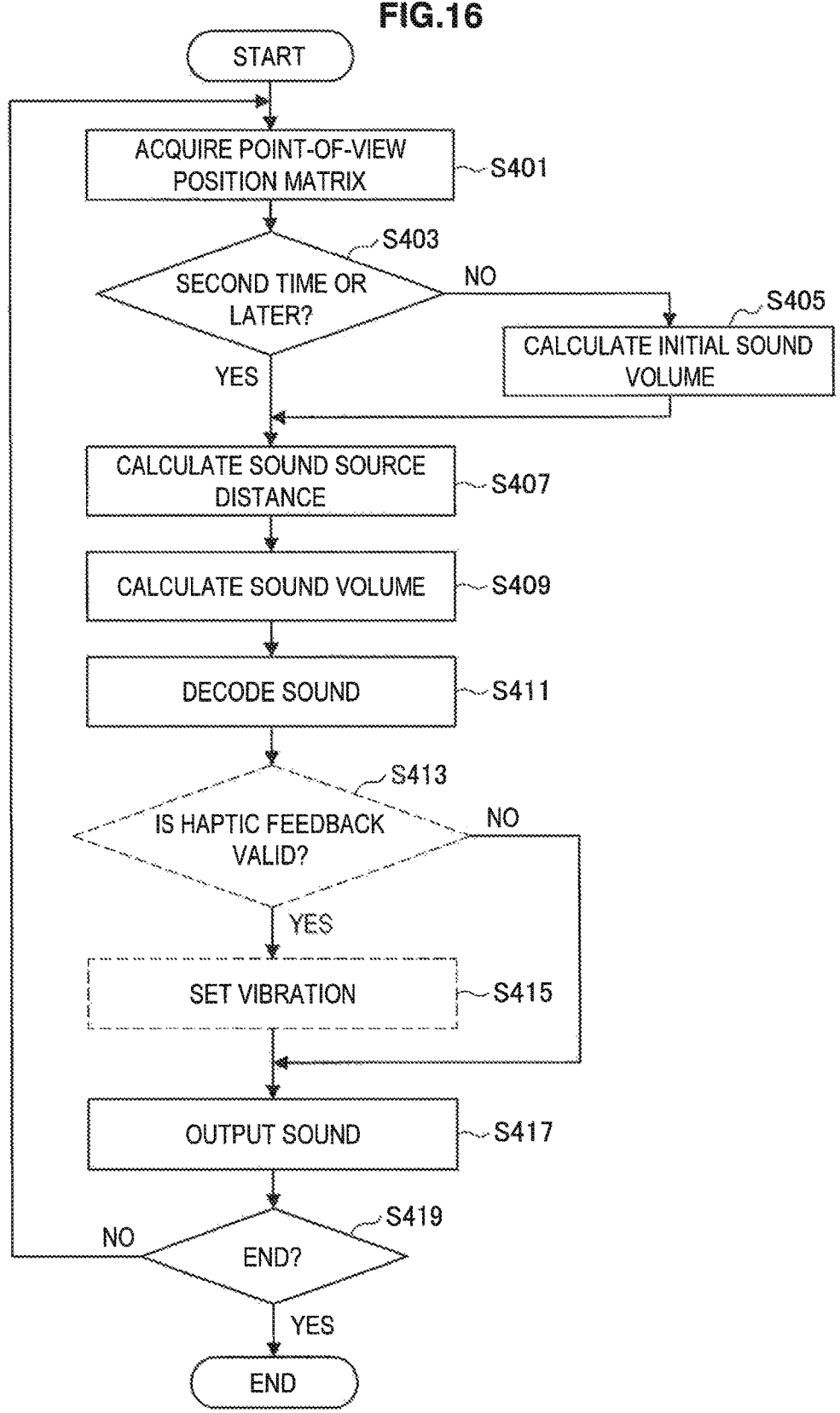
FIG. 16 is a flowchart showing an example of processing of sound output in an embodiment of the present disclosure.

FIG. 16 is a flowchart showing an example of processing of sound output in an embodiment of the present disclosure. In the processing, first, information indicating the position (the position of the point of view) of the camera of the terminal apparatus 100 is acquired as a point-of-view position matrix (step S401). The point-of-view position matrix is acquired continuously at certain intervals, for example, and shows changes in the position of the camera of the terminal apparatus 100. Next, it is determined whether the acquisition of the point-of-view position matrix is the second time or later (step S405). When the acquisition is not the second time or later (NO, that is, the first time), the scale is calculated in the above described manner as the processing for the image.

Note that, since the sound is the target of the processing in the step S405, the initial sound volume may be calculated instead of the initial display size of the object images 12. As for the sound, in reality, as a sound source is closer, the sound volume is larger; and as the sound source is farther, the sound volume is smaller. Accordingly, the volume of the sound outputted together with the object images 12 may be smaller as the distance between the terminal apparatus 100 and the poster 10 becomes larger. Note that, as in the same manner described for the scale of the image, it is not good for the user if the sound is too large or too small. Accordingly, in this example, as for the sound, in the same manner as in the case of the image, the initial sound volume is decided according to the size of the marker 11 included in the photographed image at the time the sound accompanying the object images 12 is outputted first in the terminal apparatus 100.

Next, a sound source distance is calculated (step S407). Here, on the basis of the positions of the objects and the user defined as in the example shown in FIG. 5, the distance between the user and the sound source is calculated. In order to change the reproduced sound according to the orientation of the terminal apparatus 100 and the positional relation between the terminal apparatus 100 and the poster 10, for example, the position of the sound source is set in association with the positions of the objects and the user. Note that, in this case, when there are a plurality of sound sources, the reproduced sound may be separated according to sound sources to be provided, and may be mixed at different ratios according to the positional relation between the user and the sound sources.

For example, in the case of the example shown in FIG. 1, positions of two sound sources that reproduce a left channel and a right channel, respectively, may be set on the left side and the right side of the stage. In this case, by calculating the distance (sound source distance) from the user's position to the position of the left and right sound sources, for example, sounds may be mixed in a manner that the user can hear a louder sound of the left channel if the user observes the object images 12 from the left side, and that the user can hear a louder sound of the right channel if the user observes the object images 12 from the right side. Alternatively, at the position of each member on stage, the position of the sound source that reproduces the voice of each member or the sound of the musical instrument played by each member may be set. In this case, by calculating the distance (sound source distance) from the user's position to an object displaying each member, for example, sounds may be mixed in a manner that the user can hear a louder sound of drums if the user approaches the object image 12c that displays the member playing the drums, and that the user can hear a louder sound of the guitar if the user approaches the object image 12d that displays the member playing the guitar.

Next, by use of the results of the calculation of the initial sound volume obtained in the step S405 and the calculation of the sound source distance obtained in the step S407, the sound volume to be outputted is calculated (step S409). Then, on the basis of the results of the calculation, sound is decoded (step S411).

Additionally, in the terminal apparatus 100, haptic feedback to express deep bass at the time of outputting sound may be performed by using a vibrator. In this case, it is determined whether or not the function of feedback is valid (step S413). In a case in which the function of feedback is valid (YES), vibration is set (step S415). On the other hand, even if the function of feedback is implemented, in a case in which the function of feedback is not valid (NO), vibration is not set.

Next, sound is outputted through an output device such as a speaker of the terminal apparatus 100 (step S417). In a case in which vibration is set in the step S415, the vibrator of the terminal apparatus 100 is driven in accordance with the setting. The above processing is repeated until ending conditions are satisfied (step S419).

According to the above processing, as in the case of images, sound can be outputted with reality independently of the situations in which the user observes the poster 10 through the terminal apparatus 100.

6. Display Using SLAM

Next, an example of displaying an image by using simultaneous localization and mapping (SLAM) in an embodiment of the present disclosure will be described with reference to FIG. 17 to FIG. 21.

SLAM is a technique of localizing a user's position within ambient environment and also mapping a topographical model of the ambient environment, on the basis of the results obtained by sensing the ambient environment. Since this technique itself is known, a detailed description thereof will be omitted here, and by using this technique for the terminal apparatus 100 in the present embodiment and controlling the display of each object image according to the topographical model, it becomes possible to display more appropriate object images that suit for the ambient environment.

(6-1. Display of Shadow)

Figure 17:
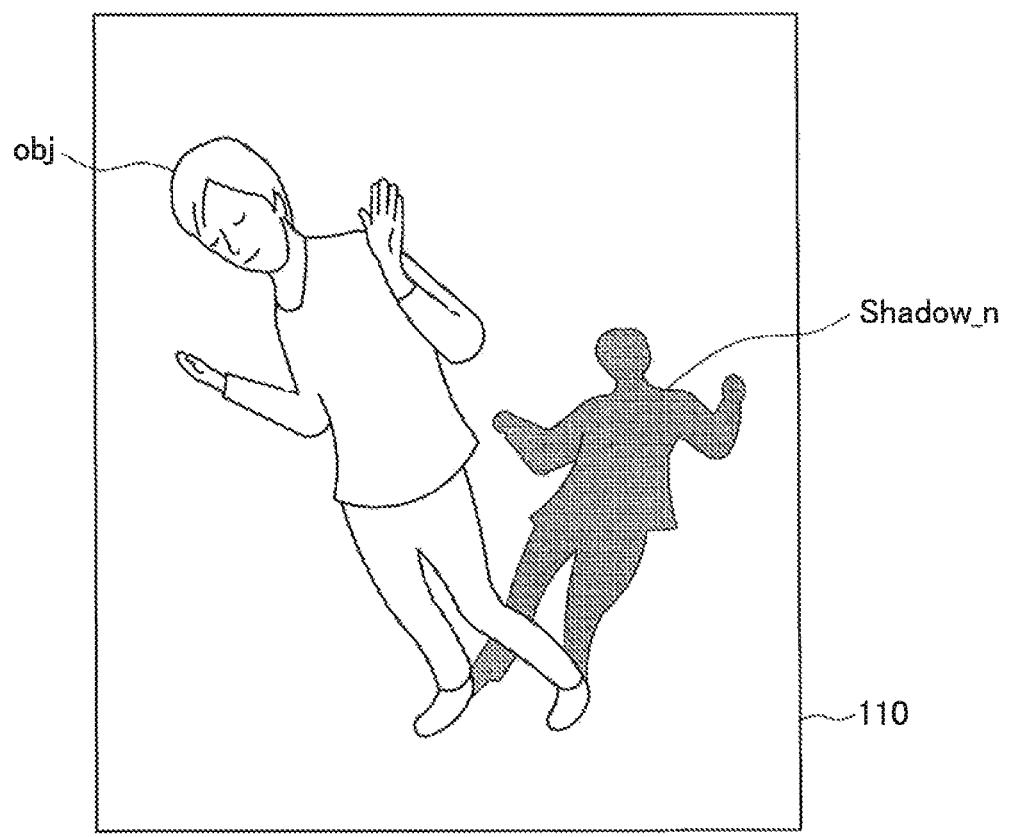
FIG. 17 shows an example of displaying a shadow of an object by using simultaneous localization and mapping (SLAM) in an embodiment of the present disclosure.
Figure 18:
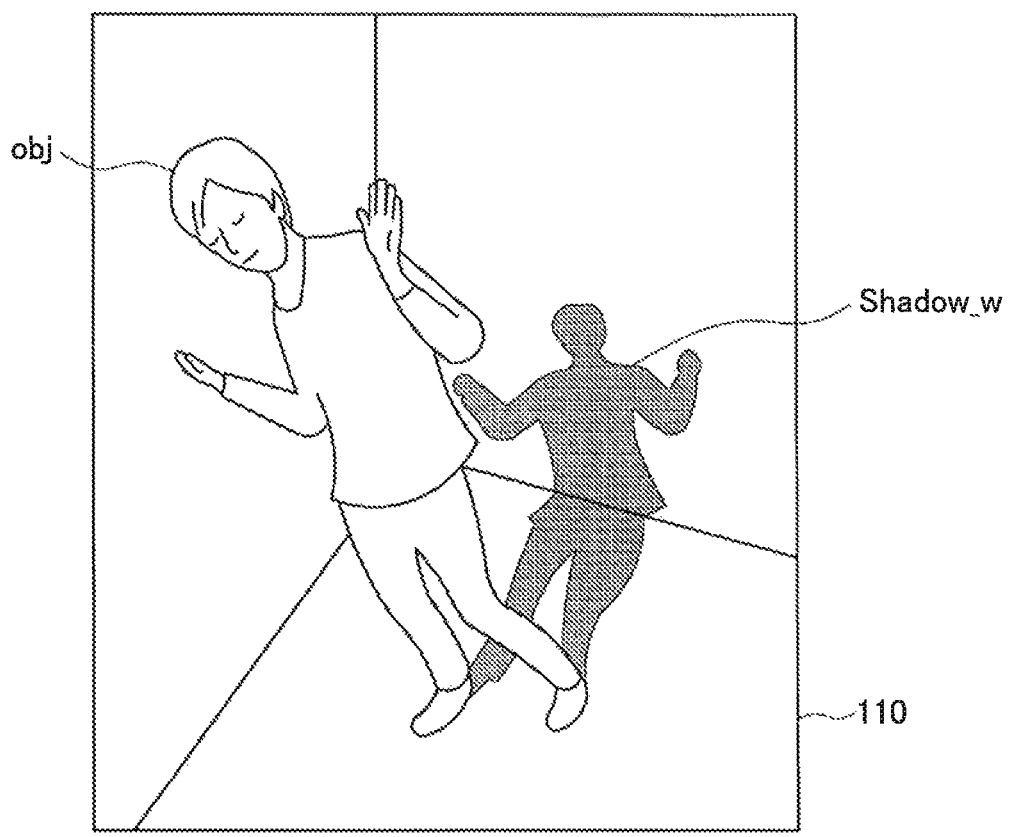
FIG. 18 shows an example of displaying a shadow of an object by using SLAM in an embodiment of the present disclosure.
Figure 19:
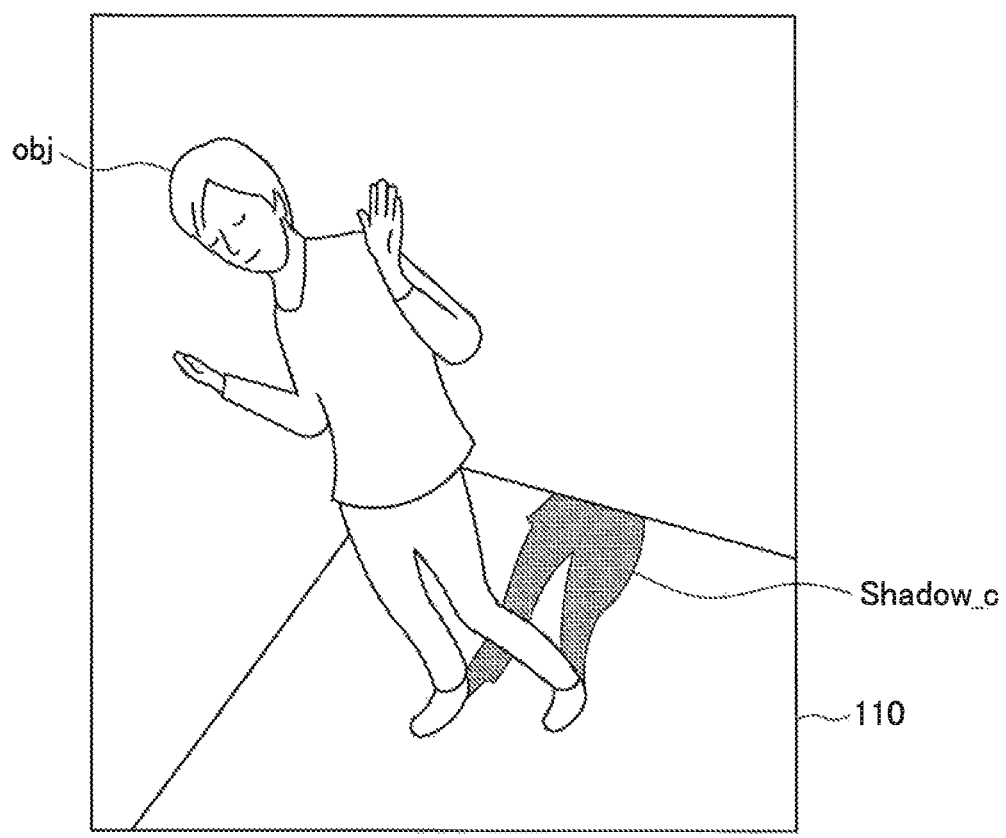
FIG. 19 shows an example of displaying a shadow of an object by using SLAM in an embodiment of the present disclosure.

FIG. 17 to FIG. 19 each show an example of displaying a shadow of an object by using SLAM in an embodiment of the present disclosure. In the shown examples, an object obj and a shadow Shadow thereof are both displayed by an object image. FIG. 17 shows an example of displaying a shadow Shadow_n of the object obj in a normal case. FIG. 18 shows an example of displaying a shadow Shadow_w of the object obj in a case in which there is a wall behind the object obj. In this case, the shadow Shadow_w is displayed in a manner that an upper half of the shadow Shadow_w is raised along the wall. FIG. 19 shows an example of displaying a shadow Shadow_c of the object obj in a case in which there is a cliff behind the object obj. In this case, the Shadow_c is cut by the edge of the cliff.

Such displays are enabled by, for example, detecting a landmark formed of feature points from the photographed image of the terminal apparatus 100 and approximating the detected landmark by a cube or the like to make a topographical model by using SLAM. For example, in the example of FIG. 18, it is detected that there are feature points showing a change of inclination behind the object obj and, on the basis of this, a cube topographical model is generated, the model constituting a wall surface. Then, display of a shadow is corrected according to the topographical model, so that the shadow Shadow_w is displayed in a manner that the upper half of the shadow Shadow_w is raised. An acceleration sensor included in the terminal apparatus 100, for example, can detect the inclination of the photographed image to specify which surface is the floor and which surface is the wall.

Figure 20:
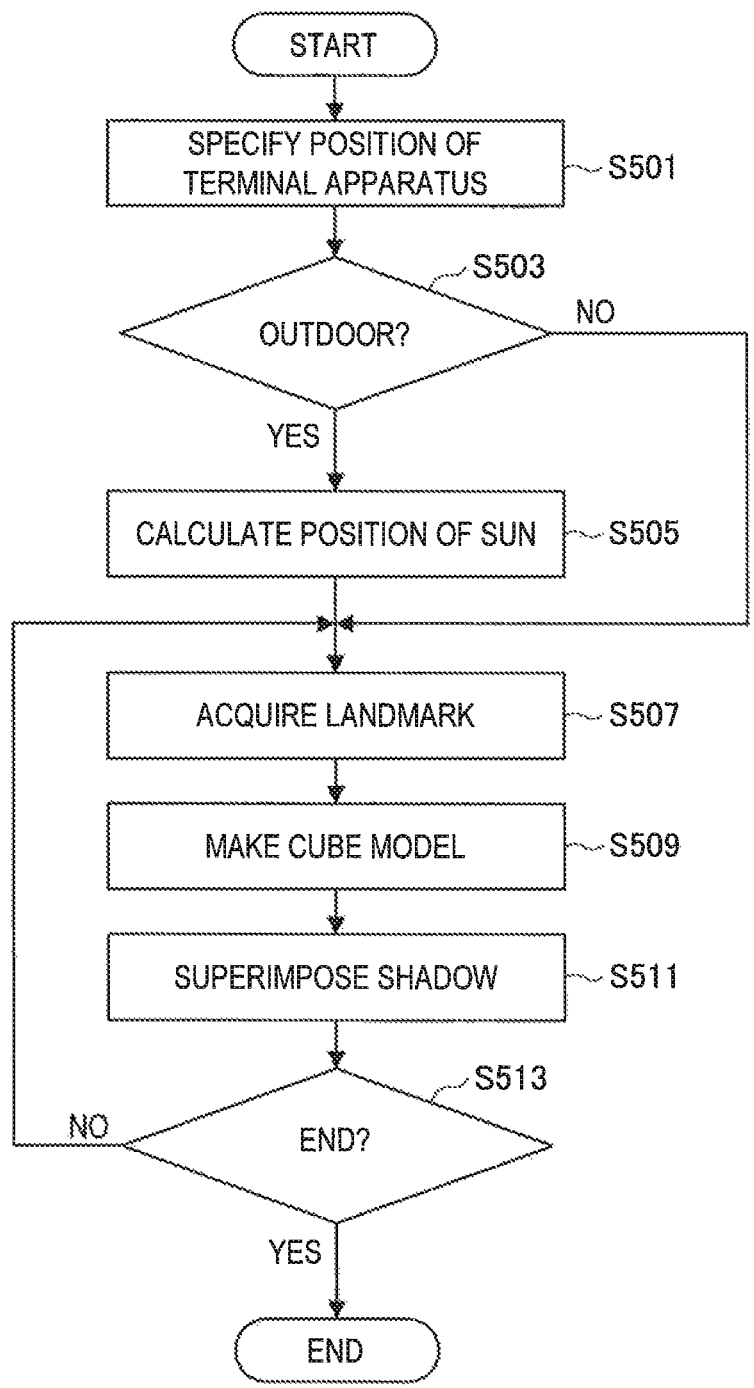
FIG. 20 is a flowchart showing an example of processing of displaying a shadow of an object by using SLAM in an embodiment of the present disclosure.

FIG. 20 is a flowchart showing an example of processing of displaying a shadow of an object by using SLAM in an embodiment of the present disclosure. First, for example, by use of a global positioning system (GPS), the position of the terminal apparatus 100 is specified (step S501). Next, on the basis of the specified position, it is determined whether the terminal apparatus 100 is in an indoor space or an outdoor space (step S503). Here, in a case in which it is determined that the terminal apparatus 100 is in an outdoor space (YES), on the basis of the positional information and time information acquired in the step S501, the position of the sun at the position of the terminal apparatus 100 is calculated (step S505). In this case, the orientation of the shadow of the object is decided on the basis of the position of the sun. On the other hand, in a case in which it is determined that the terminal apparatus 100 is not in an outdoor space (that is, in an indoor space) in the step S503, the position of the sun is not calculated; instead, the orientation of the shadow is decided on the assumption that a light source is disposed at a certain position in the indoor space (for example, a plurality of point light sources are arranged in an upper space).

Next, by use of the photographed image of the terminal apparatus 100 as an input and by use of SLAM, a landmark (SLAM landmark) included in the photographed image is acquired (step S507). On the basis of the results obtained by making a cube model of this landmark (step S509), a shadow is displayed to be superimposed on the object image (step S511). The orientation of the shadow superimposed here is the orientation that is decided in the above steps S501 to S505. The processing in the above steps S507 to S511 (from the acquisition of the SLAM landmark to the superimposedisplay of the shadow) is repeated until ending conditions are satisfied (step S513).

(6-2. Floor Surface Basis Display)

Figure 21:
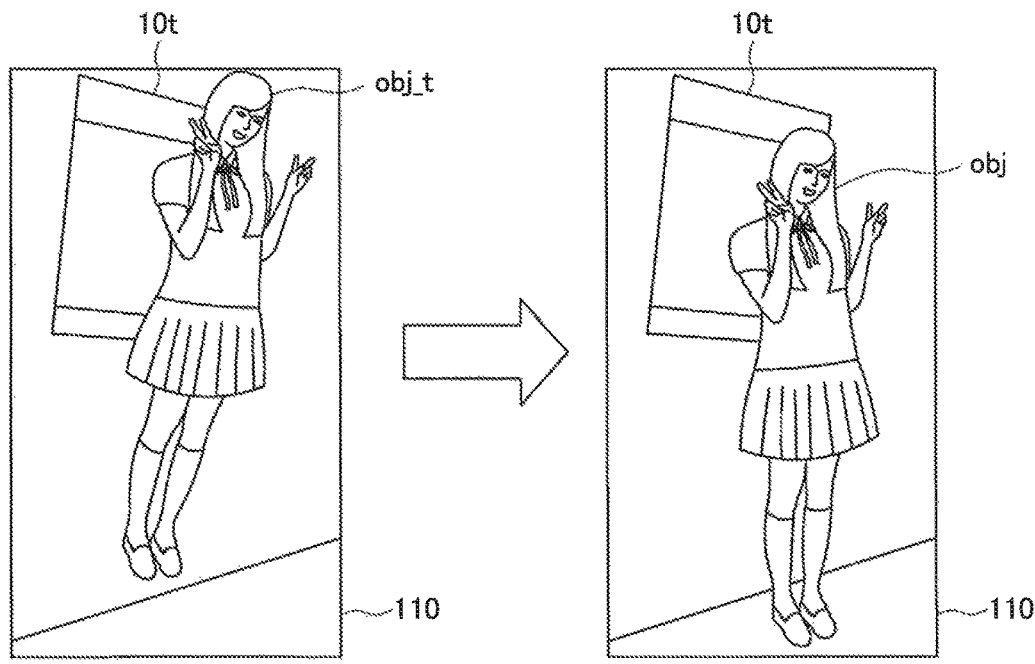
FIG. 21 shows an example of display of an object on the basis of a floor surface in an embodiment of the present disclosure.

FIG. 21 shows an example of display of an object on the basis of a floor surface in an embodiment of the present disclosure. In the example shown in FIG. 1 above, for example, the object images 12 are displayed on the basis of the marker 11 included in the poster 10. In this case, since the display positions of the object images 12 are set on the basis of the marker 11, for example, in a case of displaying the object image 12*a* that displays the stage in a manner that the object image 12*a* corresponds to the floor surface, the positional relation between the poster 10 and the floor surface needs to be adjusted in advance.

In the above case, as shown in the left side of FIG. 21, for example, if a pasted poster lot is inclined by mistake, an object obj_t is displayed in an inclined manner. As in the shown example, in a case in which an intended display is an object that seems to be standing directly on the floor surface, such display generates a particularly large feeling of strangeness. On the other hand, as in the above description of the display of the shadow, when a region of the floor surface is specified by use of SLAM, as shown in the right side of FIG. 21, the object obj can be displayed on the basis of the floor surface. Further, even when the poster 10 is inclined, the object obj can be displayed correctly.

7. Use of User's Attention Region Information

Next, an example of the use of user's attention region information in an embodiment of the present disclosure will be described with reference to FIG. 22 to FIG. 24.

In the display of an image according to the present embodiment, as described above with reference to FIG. 6 to FIG. 9, for example, on the basis of the display range of the image (refer to the example in FIG. 8, for example) or the position of the user's point of view (refer to the example in FIG. 5, for example), it is possible to specify the region (the attention region) to which the user might be paying attention particularly in the image. Information of this region can reduce the load on display processing in the above examples, and also can be used in various manners other than that.

(7-1. Display of Comments)

Figure 22:
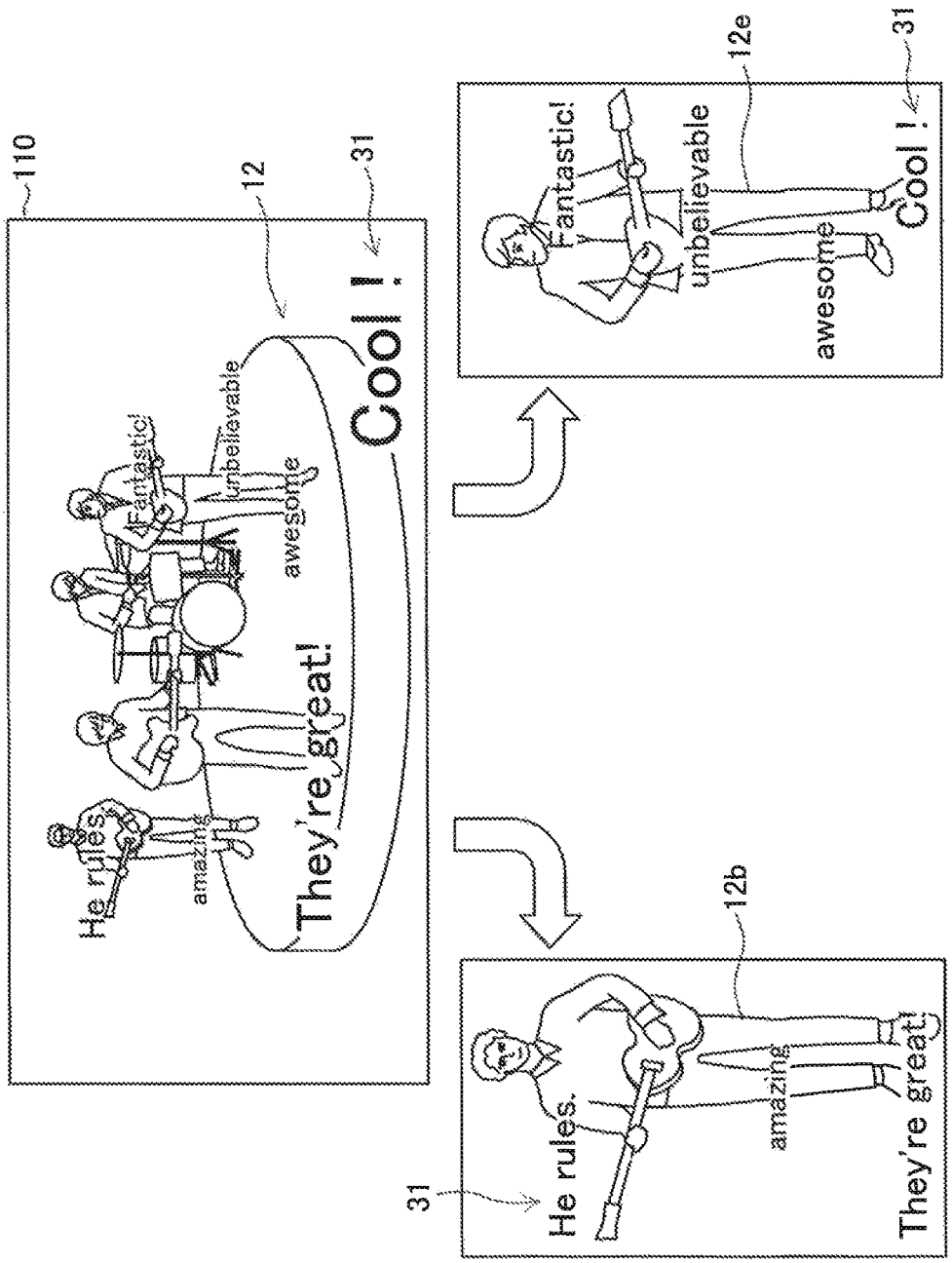
FIG. 22 shows an example of display of comments in an embodiment of the present disclosure.
Figure 23:
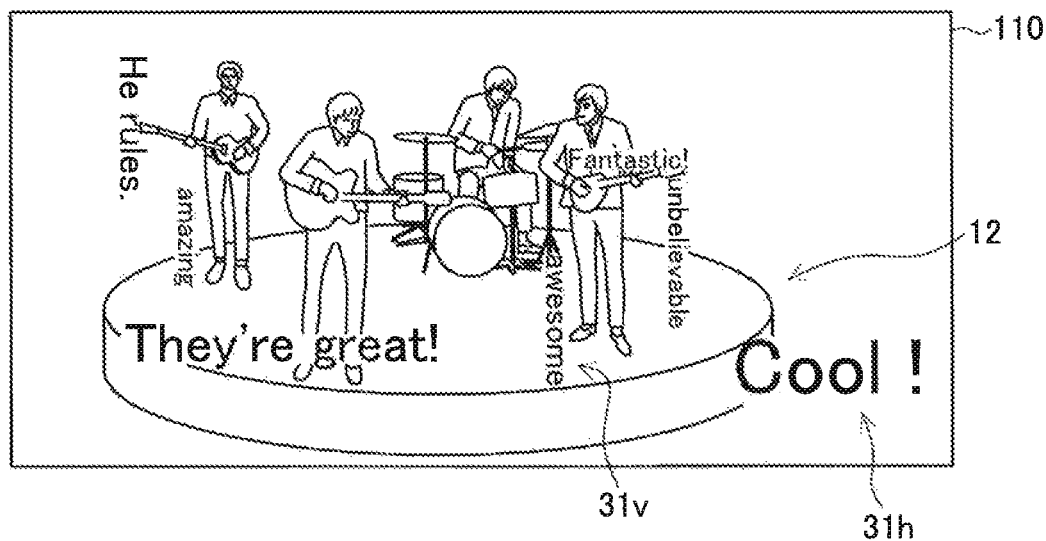
FIG. 23 shows an example of display of comments in an embodiment of the present disclosure.
Figure 24:
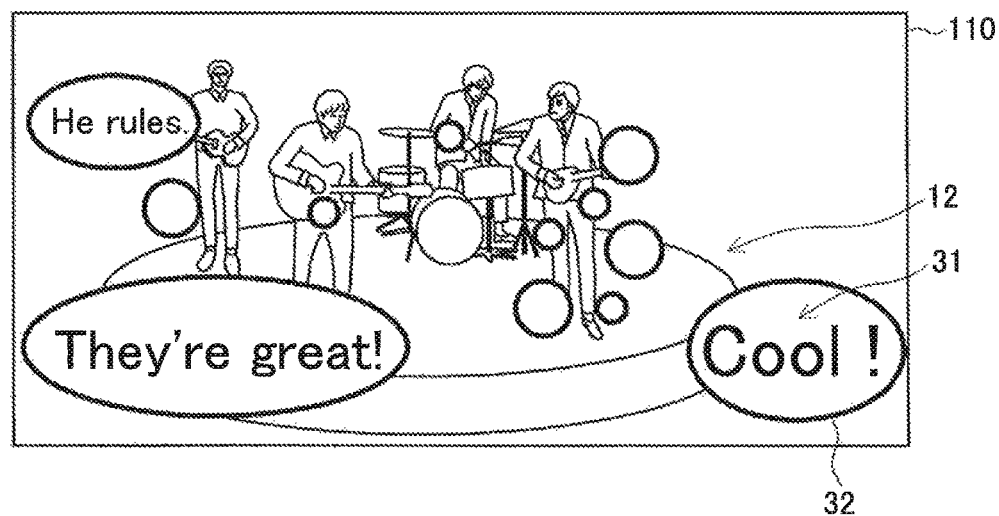
FIG. 24 shows an example of display of comments in an embodiment of the present disclosure.

FIG. 22 to FIG. 24 each show an example of display of comments in an embodiment of the present disclosure.

FIG. 22 shows an example of displaying a comment that is input by each user on a region to which a plurality of users are paying attention. A comment character string 31 displayed by being superimposed on the object image 12 displayed on the display 110 is added to the object images included in the attention region of each user who has inputted a comment. For example, the comment character string 31 that displays a comment inputted by a user who is paying attention to a region including the object image 12*b* is added to the object image 12*b*. On the other hand, the comment character string 31 that displays a comment inputted by a user who is paying attention to a region including the object image 12*e* is added to the object image 12*e*.

Note that the displayed comments may be displayed constantly at the same position to be vanished later, or may be displayed by scrolling the display position as a starting point, for example. Further, the size of characters of the comments may be set according to the distance between the user's attention region (refer to the example in FIG. 5, for example) and the position of the user's point of view, for example. The comments may be inputted to the terminal apparatus 100 not only by using a keyboard but also by using voice recognition.

FIG. 23 is a modification example of the example shown in FIG. 22, and shows an example in which a comment inputted by a user who is observing the object images 12 by horizontally orienting the display 110 is displayed as a comment character string 31*h* in which the comment is horizontally displayed, and in which a comment inputted by a user who is observing the object images 12 by vertically orienting the display 110 is displayed as a comment character string 31*v* in which the comment is vertically displayed. Thus, other users who see these comments also know in what state the users who have inputted the comments are observing the object images 12, for example.

FIG. 24 shows another modification example of the example shown in FIG. 22, and shows an example in which the comment character string 31 is displayed in a bubble 32. Thus, each of the object images 12 and the comment character string 31 are not superimposed on each other, resulting in an increase in the visibility of the image. Further, at first, the bubble 32 may be displayed in a small size without the comment character string 31, and when a user selects the bubble 32 by operation on the displayed image, the bubble 32 may be enlarged so that the comment character string 31 may be displayed. In this case, also in a case in which the comment character string 31 includes too many characters to display, by showing that there exist comments, it can be known that to which part of the object images 12 many users are paying attention.

As a still another modification example of the above example, according to a user's predetermined action on the attention region, only the bubble 32 may be displayed. The predetermined action may be a tap on the display 110, for example. This action may be used as information that directly represents the user's attention region. For example, in a state in which all the members of the band are displayed as the object images 12, when the user taps a region in which the object image 12*b* is displayed on the display 110, the position of this tap may be determined as the attention region, and the bubble 32 may be displayed in this region. Alternatively, the tap may be acquired as an action that does not specify a region, and the bubble 32 may be displayed in a region that is specified on the basis of the display range of the image or the position of the user's point of view regardless of the position of the tap.

Although not shown, there are a large number of other usage examples of the user's attention region information. For example, by specifying the object included in the user's attention region, it becomes possible to specify a member, for example, of a band or a group in which the user is interested. This result can be used for recommendation of content related to the member, measurement of the popularity stakes of the member, and the like.

It is also possible to change the display of the image or the output of the sound according to the object, for example, included in the user's attention region. For example, the object image included in the attention region may be displayed as a multi-view image or with a high resolution. Further, in a case in which a user's predetermined action on the attention region is acquired, the object image included in the attention region may be replaced by a special object image in which the object reacts to the user's action. Furthermore, the sound corresponding to the object included in the attention region may be outputted with an emphasis.

8. Use of User's Point-Of-View Positional Information

Next, examples of the use of the user's point-of-view positional information in an embodiment of the present disclosure will be described with reference to FIG. 25 to FIG. 29.

In the display of the image according to the present embodiment, as in the example shown above with reference to FIG. 5, for example, the position of the point of view of the user who observes the image can be specified. Information of the position of the point of view can also be used in various manners, like the attention region information.

(8-1. Display of Coupon)

Figure 25:
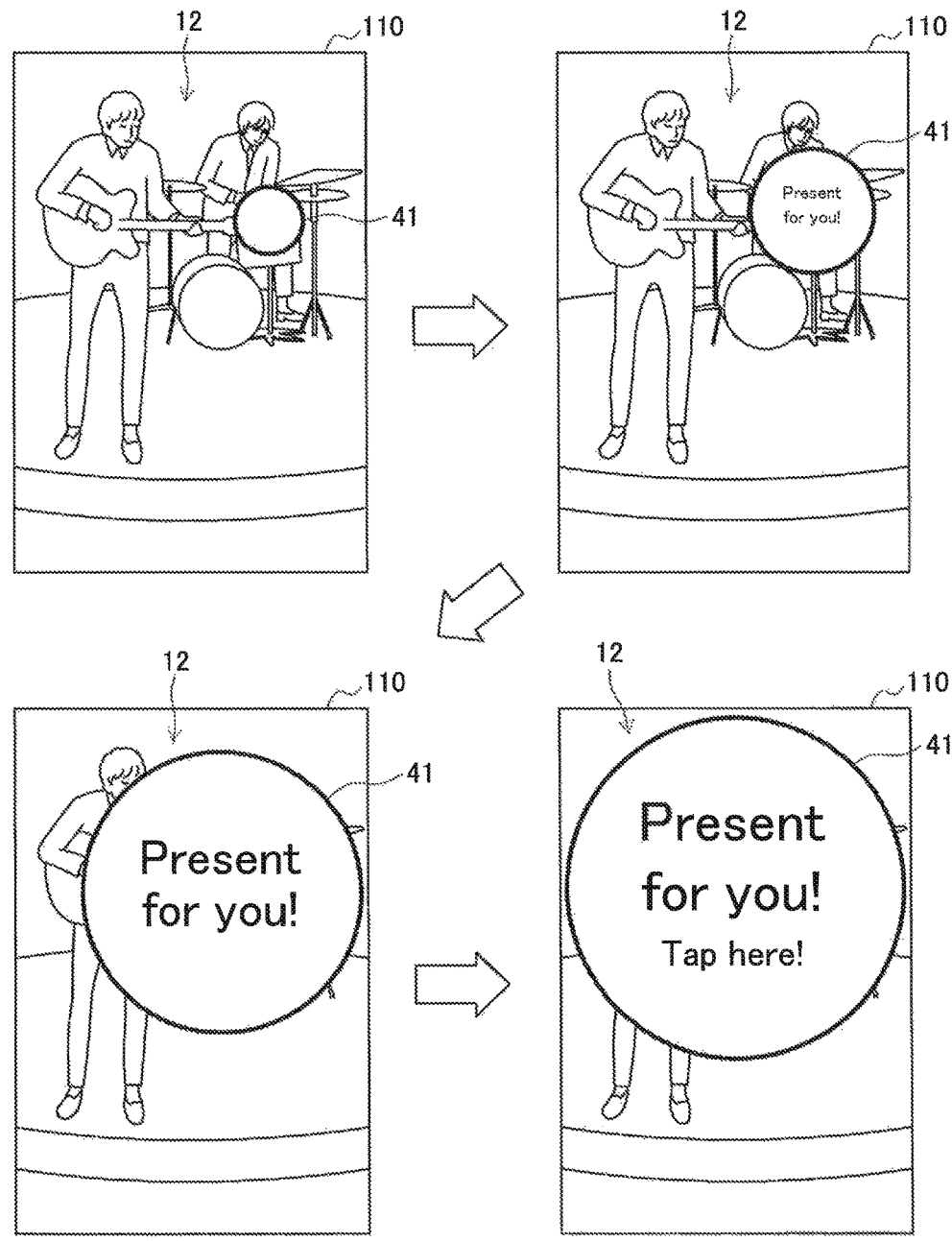
FIG. 25 shows an example of display of a coupon in an embodiment of the present disclosure.

FIG. 25 shows an example of display of a coupon in an embodiment of the present disclosure. In the shown example, a coupon image 41 is emitted from the object images 12 displayed on the display 110, and flies toward the user. Such display is possible because the position of the terminal apparatus 100 is specified as the position of the user's point of view and the position of the terminal apparatus 100 can be specified as the moving destination of the displayed coupon image 41. If the moving destination of the coupon image 41 is set at random, there will be displayed both the coupon image 41 flying toward the user and the coupon image 41 not flying toward the user, introducing a game element in the display of the coupon image 41. The coupon image 41 may display a sign ball, for example.

Note that since the position of the user's point of view is specified on the basis of the positional relation between the terminal apparatus 100 and the marker 11, for example, it is difficult to cause display in a manner that the coupon image 41 flies toward the user if the marker 11 is not appearing (the marker 11 is lost) in the photographed image of the terminal apparatus 100. However, by use of the combination of SLAM and the acceleration sensor which have been described with reference to FIG. 17 to FIG. 21, for example, when the camera of the terminal apparatus 100 is oriented upward, the coupon image 41 flying toward the sky can be displayed.

(8-2. Image Sharing with Other Users)

Figure 26:
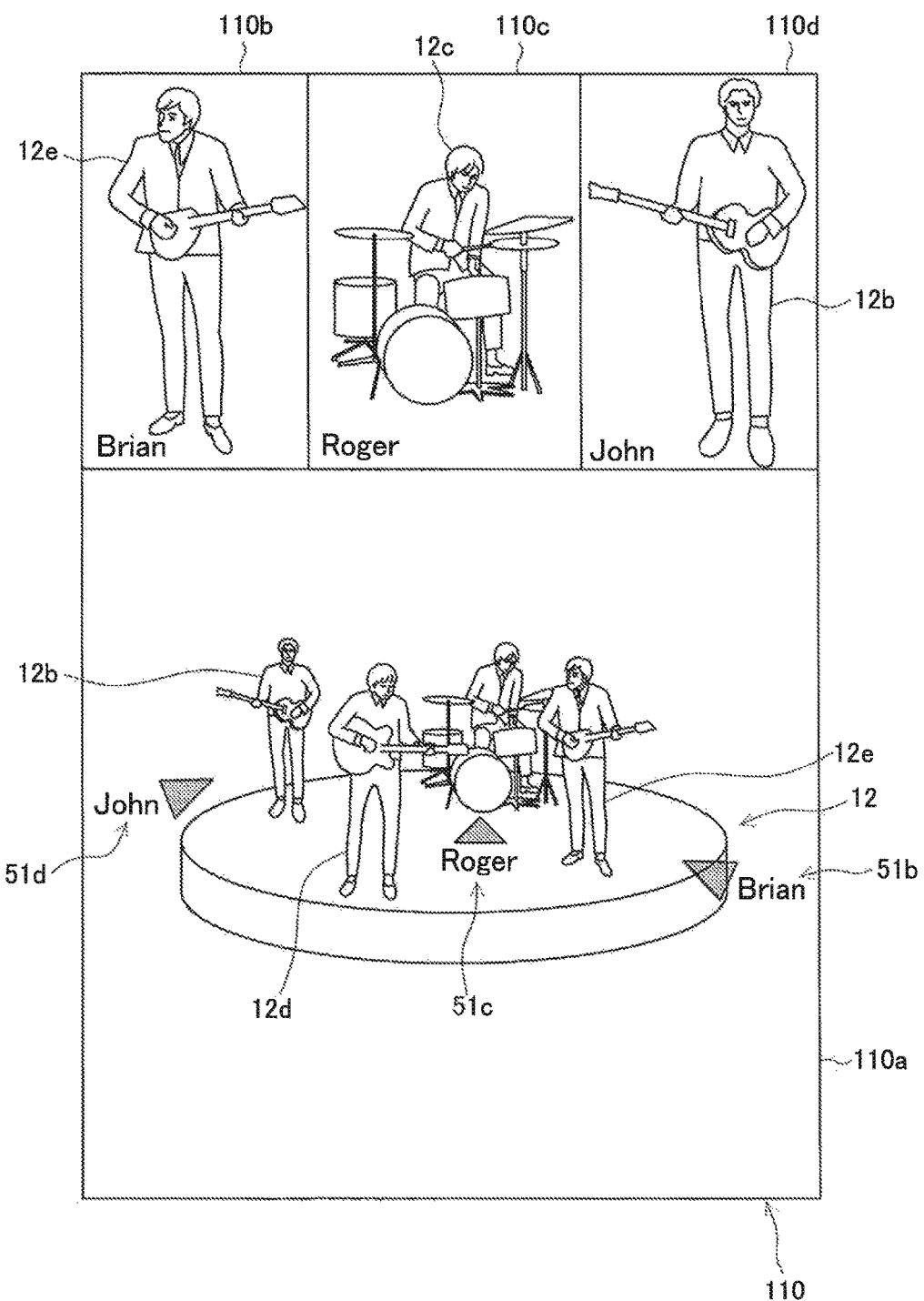
FIG. 26 shows a display example in a case of sharing display of an image with other users in an embodiment of the present disclosure.

FIG. 26 shows a display example in a case of sharing display of an image with other users in an embodiment of the present disclosure. In the shown example, the display displays, in addition to an image 110*a* observed by the user him/herself, images 110*b* to 110*d* observed by other users. Further, in the image 110*a*, icons 51*b* to 51*d* are displayed, the icons 51*b* to 51*d* representing positions of points of view of the other users.

Such display enables the user to know what kind of image the other users are observing from which position of the point of view. For example, if a user likes the object image 12*e* appearing in the image 110*b* that is observed by another user (Brian), the user can move to the same position of the point of view as Brian by referring to the point-of-view position icon 51*b* (Brian's point of view) displayed in the image 110*a*, to share the same display of the object image 12*e* with Brian.

System Configuration Example

Figure 27:
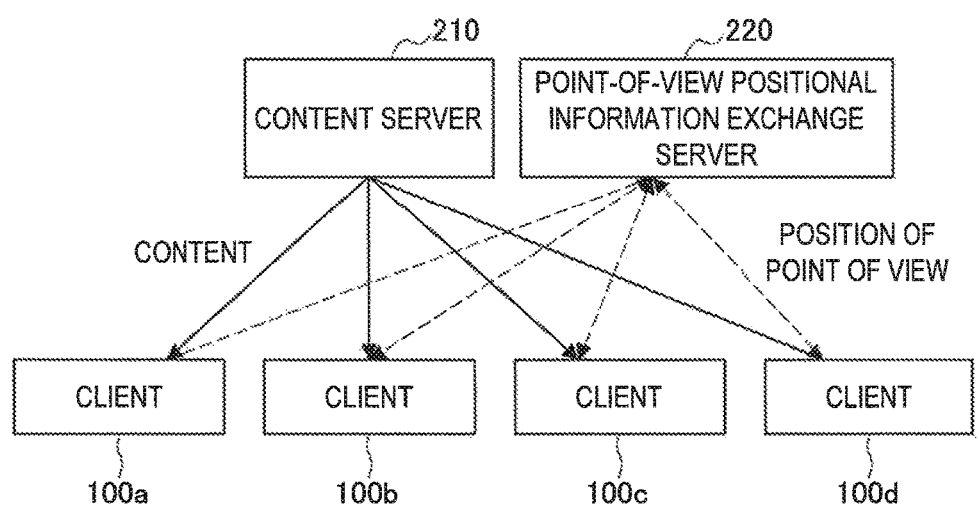
FIG. 27 shows a first system configuration example in a case of sharing display of an image with other users in an embodiment of the present disclosure.

FIG. 27 shows a first system configuration example in a case of sharing display of an image with other users in an embodiment of the present disclosure. In the shown example, clients (terminal apparatuses) 100*a* to 100*d* are each connected to a content server 210 and a point-of-view positional information exchange server 220. The content server 210 is a server that distributes the object images 12 to each client. The point-of-view positional information exchange server 220 is a server for exchange of point-of-view positional information among the clients.

As described above, the position of each user's point of view is given as numerical information such as a point-of-view position matrix, and is small as a data amount. Accordingly, the above example in which the point-of-view positional information is exchanged among the clients is suitable when there are limits on communication band and processing capacity. In each client, on the basis of the point-of-view positional information received from another client, the object images 12 displayed in each client are displayed. Note that, in this case, an image (through image) of a real space that is displayed together with the object images 12 in each client is not displayed in another client. Accordingly, a virtual image prepared in advance, for example, may be displayed on the background of the images 110*b* to 110*d* in the example shown in FIG. 26.

Figure 28:
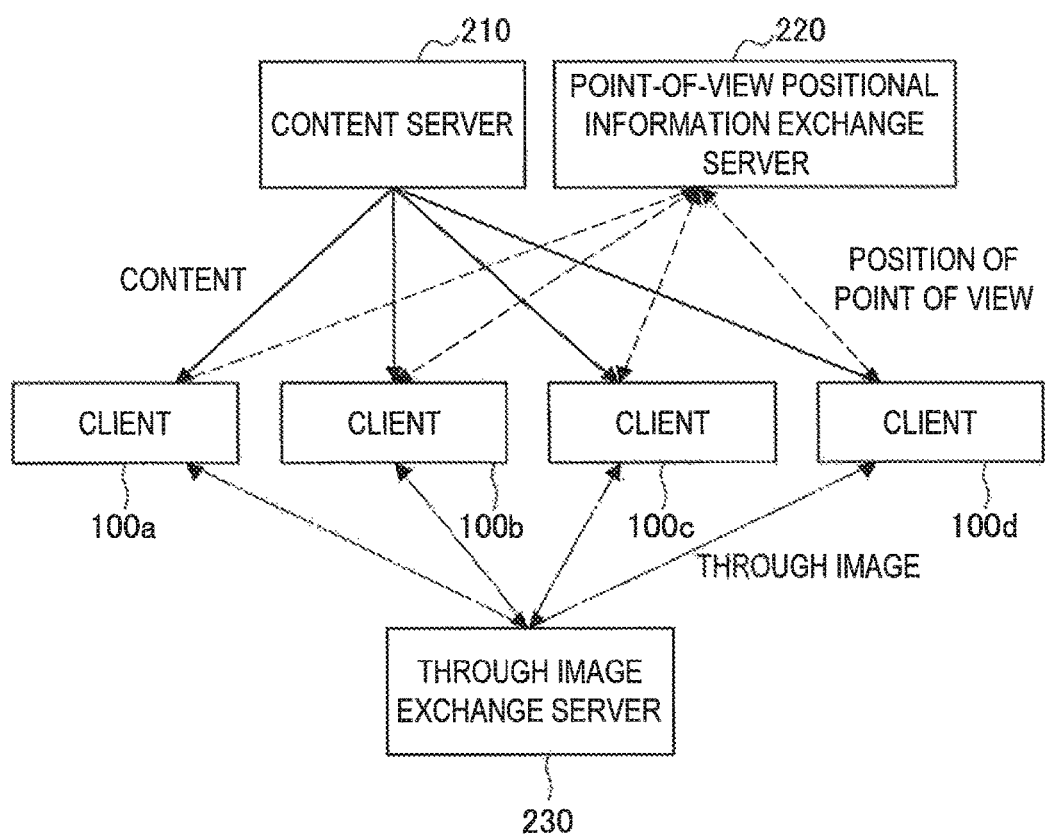
FIG. 28 shows a second system configuration example in a case of sharing display of an image with other users in an embodiment of the present disclosure.

FIG. 28 shows a second system configuration example in a case of sharing display of an image with other users in an embodiment of the present disclosure. In the shown example, the clients (terminal apparatuses) 100*a* to 100*d* are each connected to the content server 210, the point-of-view positional information exchange server 220, and a through image exchange server 230. The through image exchange server 230 is a server for exchange of a through image acquired by each client as a photographed image.

In this example, the object images 12 displayed in another client can be displayed together with the image (through image) of the real space displayed together with the object images 12 in each client. Accordingly, in the example shown in FIG. 26, for example, an image of a real space behind the object, the real space appearing when Roger is observing the object images 12 can be displayed in the image 110c.

The through image in each client has a larger data amount than the point-of-view positional information. Accordingly, in this example, a certain communication band or processing capacity is needed. However, for example, in a case in which the communication band of some of the clients is narrow, the through image is not exchanged with those clients so that the image limited to the object images 12 can be shared as in the example shown in FIG. 27. Further, in a case in which the sharing of the through image is invalidated by a user's explicit operation, the through image is not transmitted from the client of that user (the through image of the other users may be transmitted to that client). In this manner, the above example has an advantage that the through image can be exchanged or not as necessary.

As a modification example of the above example, without providing the point-of-view positional information exchange server 220, the through image of each client may be exchanged by using the through image exchange server 230. In this case, when the marker 11 is appearing in the through image, for example, it becomes possible to specify the position of the point of view in each client on the basis of the shape of the marker 11. Accordingly, it is possible to share and display the image as shown in FIG. 26 without exchange of the point-of-view positional information as long as the marker 11 is not lost in each client.

Figure 29:
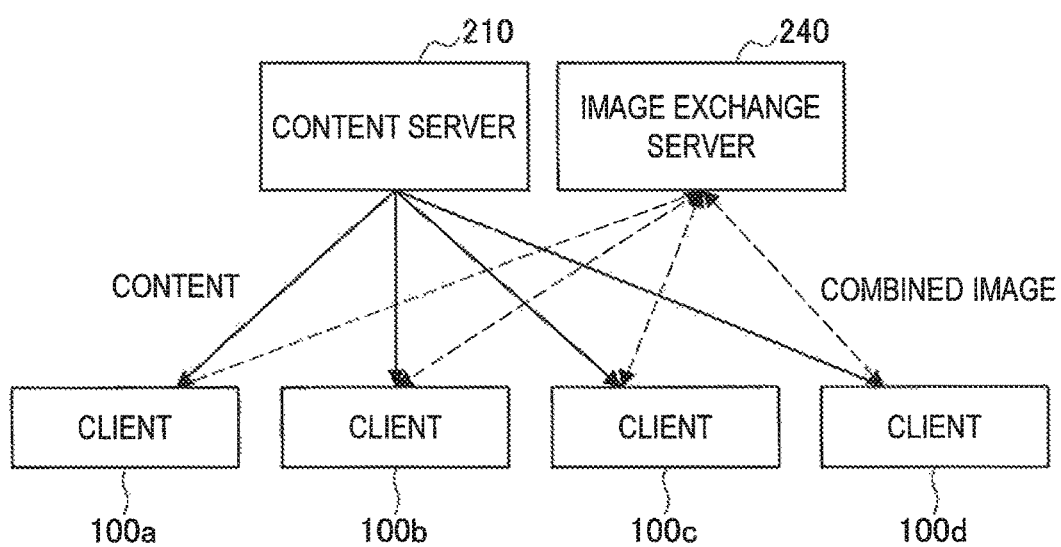
FIG. 29 shows a third system configuration example in a case of sharing display of an image with other users in an embodiment of the present disclosure.

FIG. 29 shows a third system configuration example in a case of sharing display of an image with other users in an embodiment of the present disclosure. In the shown example, the clients (terminal apparatuses) 100a to 100d are each connected to the content server 210 and an image exchange server 240. The image exchange server 240 is a server tier exchange of a combined image in which the object images 12 are superimposed on the through image by each client.

In this example, since the image in which the object images 12 are already superimposed by each client is exchanged, processing in the client on the receiving side is simplified. Note that, the combined image has a large data amount, and accordingly the required communication band is also large. Further, since the resolution of the through image and the resolution of the object images 12 cannot be set independently of each other, in a case in which the resolution of the image needs to be decreased owing to the limitation on the communication band or a user's operation, the resolution of both the through image and the object images 12 is decreased. On the other hand, in the example shown in FIG. 28, since the object images 12 displayed in another client are also depicted in the client on the receiving side, it becomes possible to maintain the resolution of the object images 12 while resolution of the through image is decreased.

9. Functional Configuration Example

Next, functional configuration examples for image display according to an embodiment of the present disclosure will be described with reference to FIG. 30 to FIG. 33. Also, a configuration example in a case of recording the displayed image will be described.

Figure 30:
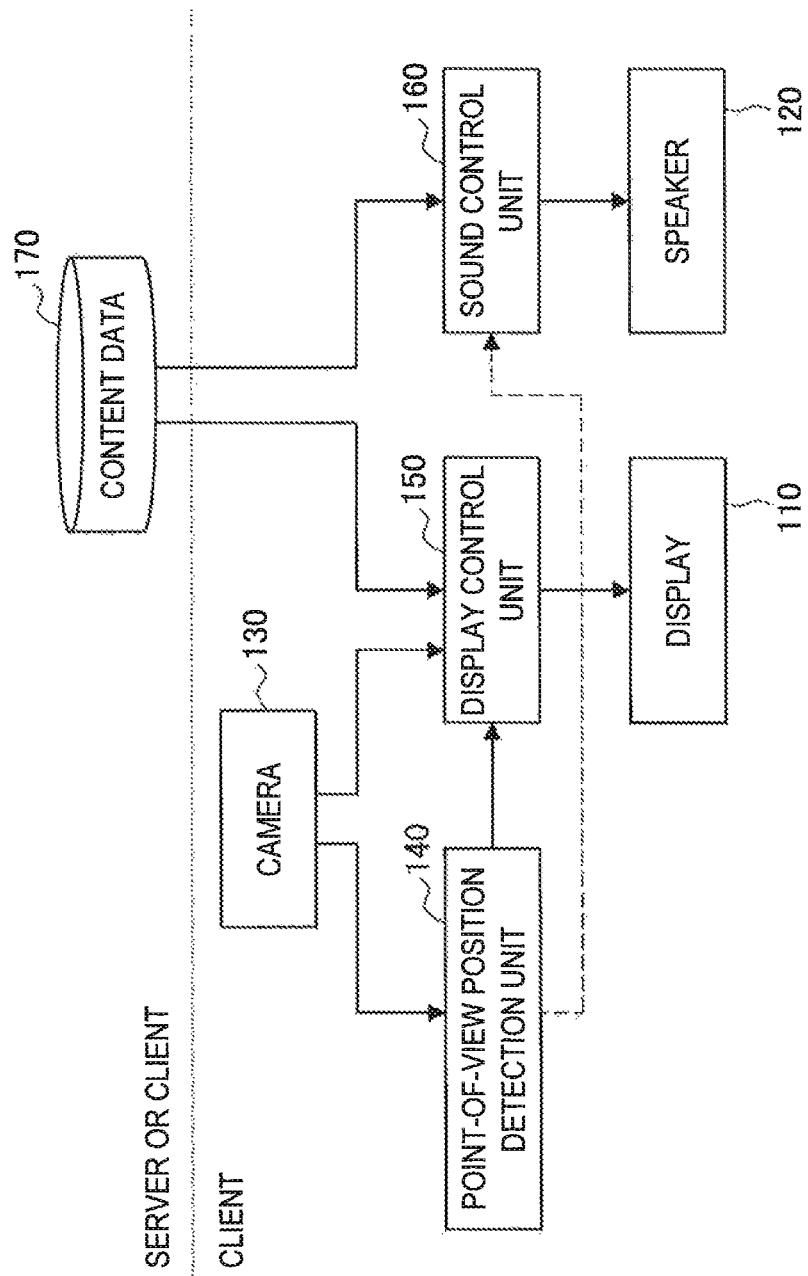
FIG. 30 shows a first functional configuration example for image display according to an embodiment of the present disclosure.

FIG. 30 shows a first functional configuration example for image display according to an embodiment of the present disclosure. The first functional configuration example includes the display 110, a speaker 120, a camera 130, a point-of-view position detection unit 140, a display control unit 150, and a sound control unit 160.

The functional configuration is included in a client such as the terminal apparatus 100. The functions of the point-of-view position detection unit 140, the display control unit 150, and the sound control unit 160 may be achieved by a CPU (central processing unit) executing a program command stored in RAM (random access memory) or ROM (read only memory), for example.

The point-of-view position detection unit 140 is an example of a state detection unit that detects the state of the user who observes the image. The point-of-view position detection unit 140 recognizes the marker 11 included in the photographed image of the real space acquired by the camera 130. A feature of the marker 11 may be registered in advance in the point-of-view position detection unit 140. The point-of-view position detection unit 140 further detects, on the basis of the shape of the detected marker 11, the position of the terminal apparatus 100 on the basis of the marker 11, i.e., the position of the point of view. For example, the point-of-view position detection unit 140 detects the distance from the marker 11 to the terminal apparatus 100 according to the size of the marker 11 included in the photographed image. Further, for example, the point-of-view position detection unit 140 detects the angle of the terminal apparatus 100 with respect to the marker 11 according to deformation of the marker 11 included in the photographed image.

As another example, the point-of-view position detection unit 140 may detect the position of the user's point of view without depending on the marker 11. For example, when the floor surface, for example, is detected by using SLAM described above or the inclination of the terminal apparatus is detected by using the results of detection by a sensor, such as an acceleration sensor, it becomes possible to detect the position of the user's point of view without depending on the marker. In this case, the object image is displayed on the basis of the floor surface, for example, and the display may be changed according to the inclination of the terminal apparatus or movement thereof in the vertical direction. As a basis of the object arrangement, any real space object may be set, the object appearing in the photographed image at the time the display of the object image is started.

The display control unit 150 executes decoding, combining, depicting, and the like on the basis of content data 170 and the image of the real space acquired from the camera 130, to display an AR image on the display 110. On the basis of the position of the point of view detected by the point-of-view position detection unit 140, for example, the display control unit 150 specifies the point of view of the object images 12, and generates the object images 12 observed from that point of view by referring to the content data 170. Further, the display control unit 150 generates an image in which the object images 12 are superimposed on the image of the real space acquired from the camera 130, and displays this image on the display 110.

Note that the display control unit 150 is a functional part that achieves each function executed from the reception of the content data 170 to the display on the display 110. Accordingly, for example, the display control unit 150 may achieve the above described processing for load reduction, setting of scale, selection of the image, display using SLAM (the topographical model by SLAM may be detected by the point-of-view position detection unit 140).

In some of the above examples, the display control unit 150 displays a plurality of display content items (object images) on the display 110 as an image, and controls, according to the state of the user who observes this image (detected by the point-of-view position detection unit 140, for example), the behavior of each display content item (each object image).

Further, the display control unit 150 may acquire, together with the content data 170, for example, information of comments (including information indicating the display position) in a case of displaying comments of other users together with the object images 12, the coupon image 41, the images 110b to 110d observed by the other users, the icons 51b to 51d representing the positions of the other users' points of view, and the like. The content data 170 may be stored in the server or in the inside of the client.

The sound control unit 160 executes decoding or combining processing on the basis of the content data 170, for example, and outputs sound corresponding to the AR image from the speaker 120. The sound control unit 160 may achieve a function of changing setting such as mixing of sounds according to the user's state such as the position of the point of view, described above as an example of the sound processing, for example.

Figure 31:
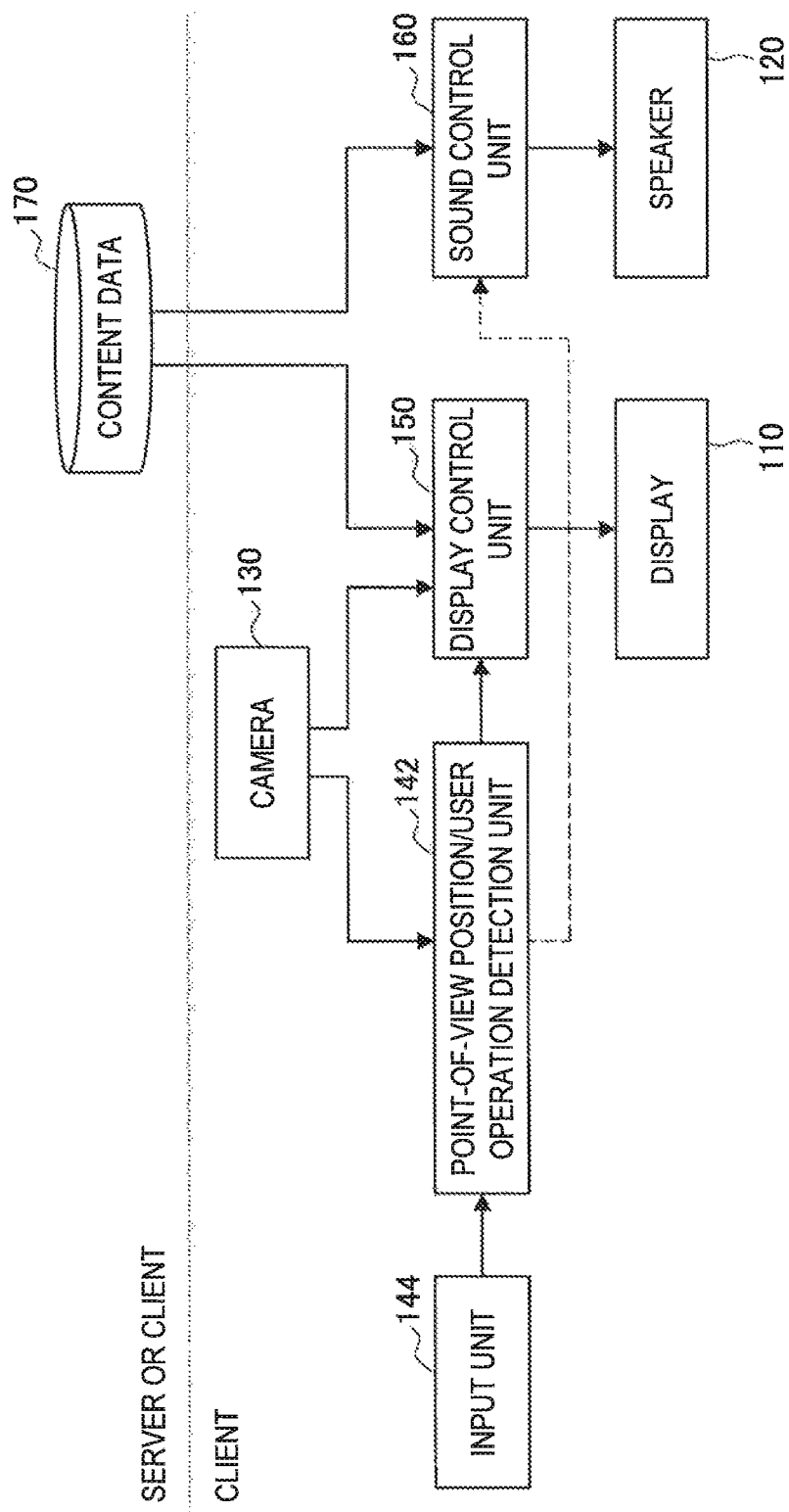
FIG. 31 shows a second functional configuration example for image display according to an embodiment of the present disclosure.

FIG. 31 shows a second functional configuration example for image display according to an embodiment of the present disclosure. The second functional configuration includes the display 110, the speaker 120, the camera 130, a point-of-view position/user operation detection unit 142, an input unit 144, the display control unit 150, and the sound control unit 160.

As in the above first functional configuration example, the functional configuration is included in a client such as the terminal apparatus 100. The functions of the point-of-view position/user operation detection unit 142, the display control unit 150, and the sound control unit 160 may be achieved by a CPU executing a program command stored in RAM or ROM, for example.

The point-of-view position/user operation detection unit 142 has both a function as the state detection unit that detects the state of the user who observes the image and a function as an operation detection unit that detects an operation of the user. The point-of-view position/user operation detection unit 142 detects the position of the point of view in the same manner as the point-of-view position detection unit 140 in the above first functional configuration example and also detects the operation of the user. The user's operation may be detected through the input unit 144, for example. An example of the input unit 144 is various input device such as a touchpad, a keyboard, or a microphone, and receives user's operation input through tap, character input, sound input, and the like. The point-of-view position/user operation detection unit 142 detects such operation input as the user's operation. The point-of-view position/user operation detection unit 142 provides, in addition to the information of the position of the point of view, information related to the acquired user's operation to the display control unit 150. Further, the point-of-view position/user operation detection unit 142 may provide such information to the sound control unit 160.

In the second functional configuration example, the display control unit 150 may acquire, from the point-of-view position/user operation detection unit 142, information of contents and display positions of the comments in display of the comments (including the bubble which does not display a comment) and information of the attention region that is specified by the user's explicit operation, for example.

Figure 32:
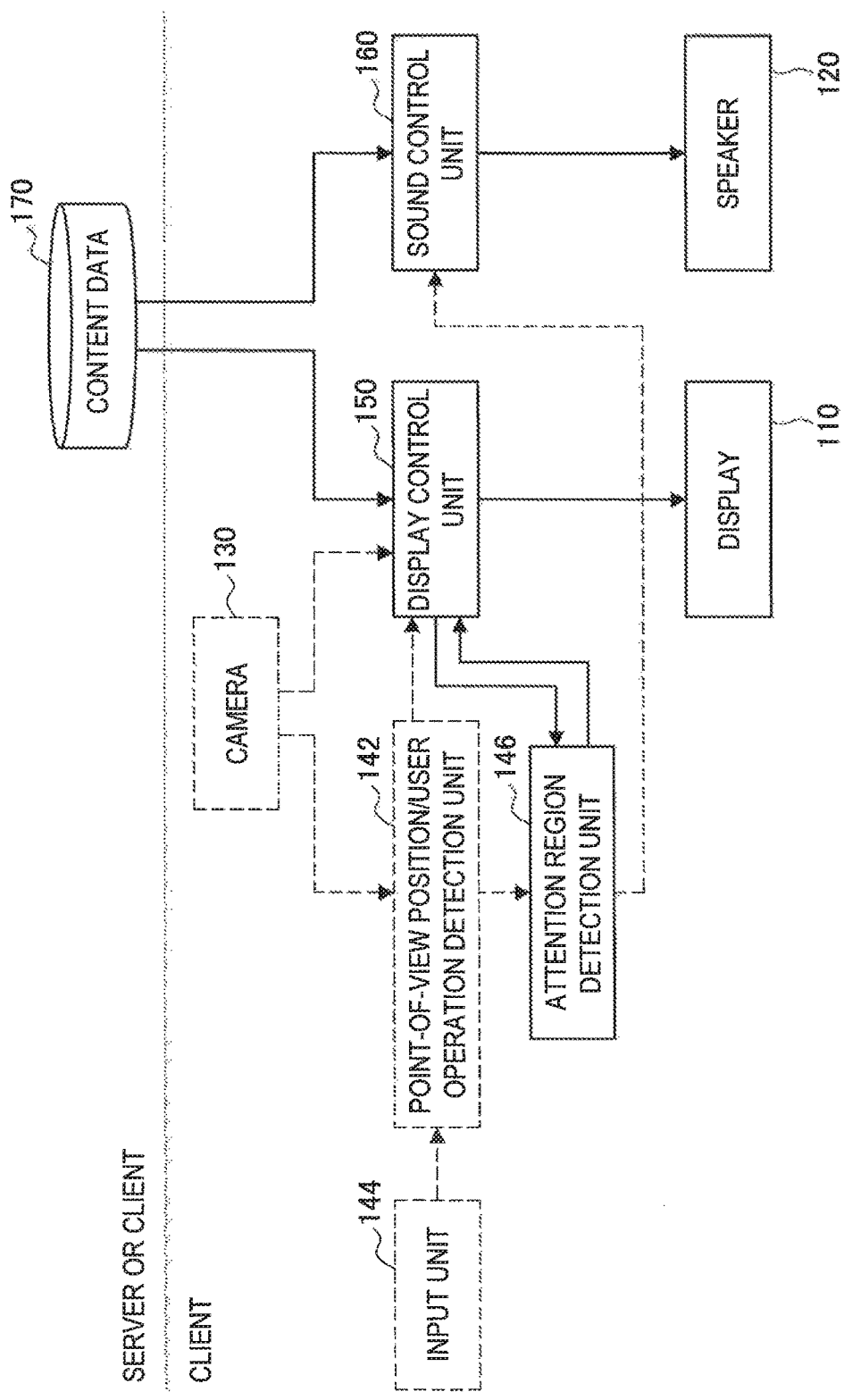
FIG. 32 shows a third functional configuration example for image display according to an embodiment of the present disclosure.

FIG. 32 shows a third functional configuration example for image display according to an embodiment of the present disclosure. The third functional configuration example includes the display 110, the speaker 120, an attention region detection unit 146, the display control unit 150, and the sound control unit 160. Further, the functional configuration may additionally include one or more of the camera 130, the input unit 144, and the point-of-view position/user operation detection unit 142 (or the point-of-view position detection unit 140).

As in the above first functional configuration example, the functional configuration is included in a client such as the terminal apparatus 100. The functions of the attention region detection unit 146, the display control unit 150, and the sound control unit 160 may be achieved by a CPU executing a program command stored in RAM or ROM, for example.

The attention region detection unit 146 is an example of the state detection unit that detects the state of the user who observes the image (the state in which the user is paying attention to the image). The attention region detection unit 146 detects, as in the example shown in FIG. 8 above, for example, the attention region that is set as a predetermined position in the image displayed on the display 110. Accordingly, the attention region detection unit 146 acquires, from the display control unit 150, information of the image displayed on the display 110.

As shown in FIG. 32, in the third functional configuration example, it is possible to refrain from including part of the functional configuration such as the camera 130. That is, the object images 12 are not necessarily an AR image displayed by being superimposed on the photographed image of the real space. In this case, the position of a user's virtual point of view may be set by a user's operation such as zooming or panning of the image displayed on the display 110, for example. Note that the change of the position of the point of view by the user's operation may be valid for an AR image. In this case, for example, the position of the point of view detected by point-of-view position/user operation detection unit 142 may be changed forcibly by a user's operation.

As described above, also in the third functional configuration example, the input unit 144 and the point-of-view position/user operation detection unit 142 may be provided. In this case, the attention region detection unit 146 may acquire the attention region that is explicitly specified by the user on the basis of the results of the detection of the user's operation by the point-of-view position/user operation detection unit 142.

(Configuration Example in a Case of Recording)

FIG. 33 shows a configuration example in a case of recording a displayed image in an embodiment of the present disclosure. As described above, in many cases, since the terminal apparatus 100 as a mobile apparatus executes the processing for image display according to the present embodiment, usable resources are limiting. Accordingly, the displayed image may be an image with a suppressed quality, such as a two-dimensional image instead of a multi-view image or an image with a low resolution. If such an image is recorded without any change, the quality thereof remains low as a matter of fact.

In the present embodiment, in a case of recording an image, the unnecessity of real-time processing of the image is focused on. By recording a minimum amount of data required at the time of displaying the image, and by combining an object image that is extracted later from high-quality content data again, it becomes possible to record an image with a higher quality.

In the shown example, as a functional configuration of a client, the display 110, the camera 130, the point-of-view position detection unit 140, and the display control unit 150 are shown. Although being omitted in FIG. 33, the functional configuration related to sound may be provided in the same manner as in the examples shown in FIG. 31 and FIG. 32. To record a displayed image, the camera 13 provides a photographed image to the display control unit 150 and also records the photographed image as photographed image data 184 in a storage device or the like. Meanwhile, the point-of-view position detection unit 140 detects the position of the point of view and provides the position of the point of view for the display control unit 150 and also records the position of the point of view as point-of-view position data 180 in a storage device or the like.

The recorded point-of-view position data 180 is provided for an image-for-recording extraction unit 182. The image-for-recording extraction unit 182 refers to the point-of-view position data 180 to extract an object image for recording from high-quality content data 172. Here, the high-quality content data 172 is data for displaying one or more pieces of the content data 170 as an object image with a higher quality, such as a multi-view image or an image with a high resolution. The generation of an object image from the high-quality content data 172 by the display control unit 150 is not realistic in many cases owing to limitation on the communication band and processing capability. However, in a case of extracting the image for recording by the image-for-recording extraction unit 182 ex-post facto, the extraction can be achieved sufficiently because there is no limitation on time, for example.

Meanwhile, the recorded photographed image data 184 is provided for an image combination unit 186. The image combination unit 186 superimposes the object image extracted by the image-for-recording extraction unit 182 on the photographed image acquired from the photographed image data 184 to generate an image similar to the image that has been displayed on the display 110 at the time of recording. Note that the object image is replaced by the image with a high quality based on the high-quality content data 172. The image generated in this manner is provided for the client as an image for recording 188.

As is clear from the above description, in a sense, the image-for-recording extraction unit 182 and the image combination unit 186 execute the same processing as the display control unit 150 by using the high-quality content data 172. The image-for-recording extraction unit 182 is desirably achieved by a server because a high processing capacity is required, but may be achieved by a client. The image combination unit 186 may be achieved by a server or a client. These functions may be achieved by a CPU executing a program command stored in RAM or ROM, for example.

The above configuration enables a client to record an image in which an object image is displayed, the object image having a higher quality than an image displayed in real time.

10. Hardware Configuration

Next, with reference to FIG. 34, a hardware configuration of a display control apparatus according to an embodiment of the present disclosure will be described. FIG. 34 is a block diagram showing a hardware configuration of the display control apparatus. A display control apparatus 900 which is shown may achieve the client (terminal apparatus) and the server in the above described embodiments, for example.

The display control apparatus 900 includes a central processing unit (CPU) 901, read only memory (ROM) 903, and random access memory (RAM) 905. Further, the display control apparatus 900 may also include a host bus 907, a bridge 909, an external bus 911, an interface 913, an input device 915, an output device 917, a storage device 919, a drive 921, a connection port 923, and a communication device 925. Furthermore, the display control apparatus 900 may include an imaging device 933 and a sensor 935 as necessary. The display control apparatus 900 may also include, instead of or along with the CPU 901, a processing circuit such as a digital signal processor (DSP).

The CPU 901 functions as an arithmetic processing unit and a control unit and controls an entire operation or a part of the operation of the display control apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a cell phone compatible with the operation of the display control apparatus 900. The input device 915 includes an input control circuit that generates an input signal on the basis of information inputted by the user and outputs the input signal to the CPU 901. The user inputs various kinds of data to the display control apparatus 900 and instructs the display control apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the display control apparatus 900 as video in the form of text or an image or as audio in the form of audio or sound.

The storage device 919 is a device for storing data configured as an example of a storage unit of the display control apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the display control apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to be directly connected to the display control apparatus 900. Examples of the connection port 923 include a universal serial bus (USB) port, an IEEE 1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the display control apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

The imaging device 933 is a device which images a real space by use of various members including an image sensor such as a charge coupled device (CCD) or a complementary metal oxide semiconductor (CMOS) and a lens for controlling image formation of a subject on the image sensor, and generates a photographed image. The imaging device 933 may image a still image or a moving image.

The sensor 935 is any of various sensors such as an acceleration sensor, a gyro sensor, a magnetic field sensor, an optical sensor, and a sound sensor. For example, the sensor 935 acquires information related to the state of the display control apparatus 900 itself, such as the orientation of the housing of the display control apparatus 900, or information related to the peripheral environment of the display control apparatus 900, such as the brightness or noise around the display control apparatus 900. Further, the sensor 935 may include a global positioning system (GPS) sensor which measures the latitude, the longitude, and the altitude of the apparatus by receiving a GPS signal.

Heretofore, an example of the hardware configuration of the display control apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

11. Supplemental Remarks

Embodiments of the present disclosure encompass the above described display control apparatus, a system, a display control method executed by the display control apparatus or system, a program for causing the display control apparatus to function, and a non-transitory physical medium having the program recorded thereon, for example.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A display control apparatus including:
 a state detection unit configured to detect a state of a user who observes an image; and
 a display control unit configured to cause a display to display the image in which a plurality of display content items are superimposed on a photographed image, and to control a behavior of each of the display content items according to the state of the user.

(2) The display control apparatus according to (1),
 wherein the state detection unit detects an attention region to which the user is paying attention in the image, and
 wherein the display control unit changes the behavior of at least one of the display content items included in the attention region.

(3) The display control apparatus according to (2),
 wherein the display control unit increases a quality of the at least one of the display content items included in the attention region.

(4) The display control apparatus according to (3),
 wherein the display control unit increases a resolution of the at least one of the display content items included in the attention region.

(5) The display control apparatus according to (3) or (4),
 wherein the display control unit increases a number of points of view that correspond to the at least one of the display content items included in the attention region.

(6) The display control apparatus according to any one of (2) to (5), further including:
 an operation detection unit configured to detect an operation of the user,
 wherein the display control unit adds display corresponding to the operation of the user to the at least one of the display content items included in the attention region.

(7) The display control apparatus according to (6),
 wherein the operation of the user is inputting a comment, and
 wherein the display corresponding to the operation of the user is a character string that displays the comment.

(8) The display control apparatus according to (6) or (7),
 wherein the state detection unit detects the attention region on the basis of the operation of the user.

(9) The display control apparatus according to any one of (2) to (7),
 wherein the state detection unit detects the attention region as a certain region in the image displayed on the display.

(10) The display control apparatus according to any one of (1) to (9),
 wherein the state detection unit detects a position of a point of view of the user, the position being defined in a space, and
 wherein the display control unit causes a plurality of objects to be displayed by using each of the display content items, the objects having display positions defined in the space, and also changes the behavior of each of the display content items on the basis of a relation between the position of the point of view and the display positions.

(11) The display control apparatus according to (10), wherein the display control unit increases a quality of at least one of the display content items that display respective objects having display positions closer to the position of the point of view.

(12) The display control apparatus according to (10) or (11), wherein the display control unit determines whether or not each of the objects is displayed in the image on the basis of the position of the point of view and the display positions, and excludes, from a target to be depicted, at least one of the display content items that display the objects that are not to be displayed.

(13) The display control apparatus according to any one of (10) to (12), wherein the display control unit superimposes and displays each of the display content items as a layered image and also rotates the layered image on the basis of the display positions according to movement of the position of the point of view to make each of the objects face the position of the point of view.

(14) The display control apparatus according to any one of (1) to (13), wherein the state detection unit detects a position of a point of view of the user on the basis of a marker disposed in a real space, and wherein, when a plurality of objects are displayed by using each of the display content items, the objects having display positions defined virtually on the basis of the marker in the real space, the display control unit decides scale of disposition of the display positions and an initial display size of each of the objects according to a distance from the marker to the position of the point of view.

(15) The display control apparatus according to any one of (1) to (14), wherein the state detection unit detects a position of a point of view of the user on the basis of a marker disposed in a real space, and wherein, when a plurality of objects are displayed by using each of the display content items, the objects having display positions defined virtually on the basis of the marker in the real space, the display control unit decides orientation in a vertical direction of each of the objects displayed by using each of the display content items according to an elevation angle or a depression angle of the marker with respect to the position of the point of view.

(16) The display control apparatus according to any one of (1) to (15), wherein the state detection unit detects a topographical model of a real space observed by the user, and wherein, when a plurality of objects are displayed by using each of the display content items, the objects having display positions defined virtually in the real space, the display control unit controls the behavior of each of the display content items according to the topographical model.

(17) The display control apparatus according to (16), wherein, when displaying a first object and a shadow thereof as the plurality of objects by using each of the display content items, the display control unit corrects display of the shadow according to the topographical model.

(18) The display control apparatus according to any one of (1) to (17), further including: a sound control unit configured to control output of sound corresponding to the image and to control setting of the sound according to the state of the user.

(19) A display control method including:
causing a display to display an image in which a plurality of display content items are superimposed on a photographed image;
detecting a state of a user who observes the image; and
controlling a behavior of each of the display content items according to the state of the user.

(20) A program for causing a computer to achieve:
a function of causing a display to display an image in which a plurality of display content items are superimposed on a photographed image;
a function of detecting a state of a user who observes the image; and
a function of controlling a behavior of each of the display content items according to the state of the user.

REFERENCE SIGNS LIST 10 poster
11 marker
12 object image
21 attention region
31 comment character string
32 bubble
41 coupon image
100 terminal apparatus
110 display
120 speaker
130 camera
140 point-of-view position detection unit
142 point-of-view position/user operation detection unit
144 input unit
146 attention region detection unit
150 display control unit
160 sound control unit
182 image-for-recording extraction unit
184 image combination unit

The invention claimed is:

1. A display control apparatus comprising:
a state detection unit configured to
detect a state of a user who observes an image, and
detect an environment information of a real space observed by the user, the environment information including a topographical model of the real space; and
a display control unit configured to cause a display to display the image in which a plurality of display content items are superimposed on a photographed image, and to control a behavior of each of the display content items according to the state of the user,
wherein the display control unit is further configured to control the behavior of each of the display content items according to the topographical model, and
wherein the state detection unit and the display control unit are each implemented via at least one processor.

2. The display control apparatus according to claim 1, wherein the state detection unit is further configured to detect an attention region to which the user is paying attention in the image, and
wherein the display control unit changes the behavior of at least one of the display content items included in the attention region.

3. The display control apparatus according to claim 2, wherein the display control unit is further configured to increase a quality of the at least one of the display content items included in the attention region.

4. The display control apparatus according to claim 2,
   wherein the display control unit is further configured to increase a resolution of the at least one of the display content items included in the attention region.

5. The display control apparatus according to claim 2,
   wherein the display control unit is further configured to increase a number of points of view that correspond to the at least one of the display content items included in the attention region.

6. The display control apparatus according to claim 2, further comprising:
   an operation detection unit configured to detect an operation of the user,
   wherein the display control unit is further configured to cause the display to additionally display content corresponding to the operation of the user, to the at least one of the display content items included in the attention region, and
   wherein the operation detection unit is implemented via at least one processor.

7. The display control apparatus according to claim 6,
   wherein the operation of the user comprises inputting a comment, and
   wherein the additionally displayed content corresponding to the operation of the user comprises a character string that includes the comment.

8. The display control apparatus according to claim 6,
   wherein the state detection unit detects the attention region on a basis of the operation of the user.

9. The display control apparatus according to claim 2,
   wherein the state detection unit detects the attention region as a certain region in the image displayed on the display.

10. The display control apparatus according to claim 1,
    wherein the display control unit is further configured to increase a quality of at least one of the display content items that display respective objects having display positions closer to the user.

11. The display control apparatus according to claim 1,
    wherein the display control unit superimposes and displays each of the display content items as a layered image and also rotates the layered image according to movement of the user to make each of the display content items face the user.

12. The display control apparatus according to claim 1,
    wherein the state detection unit is further configured to detect a position of a point of view of the user on a basis of a marker disposed in a real space, and
    wherein, when a plurality of objects are displayed by using each of the display content items, the objects having display positions defined virtually on the basis of the marker in the real space, the display control unit determines scale of disposition of the display positions and an initial display size of each of the objects according to a distance from the marker to the position of the point of view.

13. The display control apparatus according to claim 1,
    wherein the state detection unit is further configured to detect a position of a point of view of the user on a basis of a marker disposed in a real space, and
    wherein, when a plurality of objects are displayed by using each of the display content items, the objects having display positions defined virtually on the basis of the marker in the real space, the display control unit determines orientation in a vertical direction of each of the objects displayed according to an elevation angle or a depression angle of the marker with respect to the position of the point of view.

14. The display control apparatus according to claim 1, further comprising:
    a sound control unit configured to control output of sound corresponding to the image and to control setting of the sound according to the state of the user,
    wherein the sound control unit is implemented via at least one processor.

15. The display control apparatus according to claim 1,
    wherein, when a plurality of objects are displayed by using each of the display content items, the objects having display positions defined virtually in the real space, the display control unit controls the behavior of each of the display content items according to the topographical model.

16. The display control apparatus according to claim 15,
    wherein, when displaying a first object and a shadow thereof as the plurality of objects by using each of the display content items, the display control unit corrects display of the shadow according to the topographical model.

17. The display control apparatus according to claim 1,
    wherein the behavior of each of the display content items changes in relation to a distance between the user and one or more respective display content items, and
    wherein a size of each of the display content items is changed in relation to the distance between the user and the one or more respective display content items.

18. A display control method, the method being executed via at least one processor, and comprising:
    detecting a state of a user who observes an image;
    detecting an environment information of a real space observed by the user, the environment information including a topographical model of the real space;
    displaying the image in which a plurality of display content items are superimposed on a photographed image;
    controlling a behavior of each of the display content items according to the state of the user; and
    controlling the behavior of each of the display content items according to the topographical model.

19. A non-transitory computer-readable medium having embedded thereon a program, which when executed by a computer causes the computer to execute a method, the method comprising:
    detecting a state of a user who observes an image;
    detecting an environment information of a real space observed by the user, the environment information including a topographical model of the real space;
    displaying the image in which a plurality of display content items are superimposed on a photographed image;
    controlling a behavior of each of the display content items according to the state of the user; and
    controlling the behavior of each of the display content items according to the topographical model.

20. The display control apparatus according to claim 1,
    wherein the environment information further includes a lighting condition of the real space, and
    wherein the display control unit is further configured to control the behavior of each of the display content items according to the lighting condition.

* * * * *